United States Patent
Shiizaki et al.

(10) Patent No.: US 8,842,699 B2
(45) Date of Patent: Sep. 23, 2014

(54) WIRELESS COMMUNICATION SYSTEM AND RETRANSMISSION METHOD

(75) Inventors: Kotaro Shiizaki, Kawasaki (JP); Daisuke Jitsukawa, Kawasaki (JP); Kenji Suda, Kawasaki (JP); Hiroyuki Seki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 280 days.

(21) Appl. No.: 12/959,901

(22) Filed: Dec. 3, 2010

(65) Prior Publication Data
US 2011/0078530 A1 Mar. 31, 2011

Related U.S. Application Data

(63) Continuation of application No. 12/003,823, filed on Jan. 2, 2008, now Pat. No. 7,869,463, which is a continuation of application No. PCT/JP2005/012677, filed on Jul. 8, 2005.

(51) Int. Cl.
| | | |
|---|---|---|
| *H04J 3/00* | (2006.01) | |
| *H04L 12/801* | (2013.01) | |
| *H04L 12/841* | (2013.01) | |
| *H04L 1/18* | (2006.01) | |
| *H04L 1/16* | (2006.01) | |

(52) U.S. Cl.
CPC .............. *H04L 47/10* (2013.01); *H04L 1/1874* (2013.01); *H04L 47/283* (2013.01); *H04L 1/1607* (2013.01); *H04L 1/1887* (2013.01)
USPC ........... 370/498; 370/464; 370/229; 370/231; 455/73

(58) Field of Classification Search
USPC ......... 370/431, 445, 447, 448, 229, 230, 231, 370/464, 498; 455/73
See application file for complete search history.

(56) References Cited

U.S. PATENT DOCUMENTS

| | | | | |
|---|---|---|---|---|
| 7,075,913 | B1 * | 7/2006 | Yavuz et al. | 370/335 |
| 2003/0009717 | A1 * | 1/2003 | Fukushima et al. | 714/748 |

(Continued)

FOREIGN PATENT DOCUMENTS

| | | |
|---|---|---|
| CN | 1622536 | 6/2005 |
| EP | 1357695 | 10/2003 |

(Continued)

OTHER PUBLICATIONS

The State Intellectual Property Office of China "2nd Notification of Office Action" issued for corresponding Chinese Patent Application No. 200580051014.5, dated May 25, 2011. English translation attached.

(Continued)

*Primary Examiner* — Un C Cho
*Assistant Examiner* — Siming Liu
(74) *Attorney, Agent, or Firm* — Myers Wolin, LLC

(57) ABSTRACT

A wireless communication system in which retransmission is performed between a transmitting apparatus and a receiving apparatus, whereby the transmitting apparatus includes, a first transmitting unit to transmit first data to the receiving apparatus and retransmission controlling unit to perform transmission of second data, the data part of which is same as that of the first data, without waiting for a feedback signal from receiving apparatus regarding the first data, and to wait for a feedback signal from the receiving apparatus regarding the second data, and the receiving apparatus includes, a second transmitting unit to transmit the feedback signal regarding the second data to the transmitting apparatus.

14 Claims, 23 Drawing Sheets

(56) References Cited

U.S. PATENT DOCUMENTS

| | | |
|---|---|---|
| 2003/0202500 A1 | 10/2003 | Ha et al. |
| 2004/0132442 A1* | 7/2004 | Zimmermann et al. ...... 455/423 |
| 2004/0165543 A1 | 8/2004 | Nakazawa |
| 2005/0117515 A1 | 6/2005 | Miyake |
| 2005/0226182 A1 | 10/2005 | Itoh |

FOREIGN PATENT DOCUMENTS

| | | |
|---|---|---|
| EP | 1463228 | 9/2004 |
| EP | 1536589 | 6/2005 |
| EP | 1551126 | 7/2005 |
| JP | 2003-016027 | 1/2003 |
| JP | 2004-349783 | 12/2004 |
| WO | 2005109729 | 11/2005 |

OTHER PUBLICATIONS

Rejection Decision issued by the State Intellectual Property Office of China for corresponding application No. 200580051014.5 dated Jan. 31, 2012 with English Translation attached.

The extended European search report includes European search opinion, issued for corresponding European Patent Application No. 05758321.3 mailed Jan. 4, 2012.

LG Electronics; Agenda item 4.4; "Node B Scheduling of HARQ retransmission"; 3GPP TSG RAN WG1; R1-040022; Ad Hoc; Espoo, Finland; Jan. 27-30, 2004.

Ericsson; Agenda item 3.2; "User plane protocol evolution for evolved UTRAN"; TSG-RAN WG2 LTE; R2-051742; Ad Hoc; Sophia Antipolis, France; Jun. 20-21, 2005.

The State Intellectual Property Office of China "First Notification of Office Action" issued for corresponding Chinese Patent Application No. 201010557845.2, issued on Dec. 7, 2011. English translation attached.

United States Patent and Trademark Office "Non-Final Office Action" issued for corresponding U.S. Appl. No. 12/003,823 on Oct. 8, 2009.

United States Patent and Trademark Office "Final Office Action" issued for corresponding U.S. Appl. No. 12/003,823 on Apr. 15, 2010.

Japanese Patent Office "Notice of Rejection Ground" issued for corresponding Japanese Patent Application No. 2010-007938, mailed Aug. 23, 2011. English translation attached.

The extended European search report includes the European search report and the European search opinion issued for corresponding European Patent Application No. 12179014.1, dated Sep. 27, 2012.

Third (3rd) Notification of Office Action issued for corresponding Chinese Patent Application No. 200580051014.5 dated Jul. 27, 2012 with English translation.

Office Action issued for corresponding Chinese Patent Application No. 201010557845.2, dated May 6, 2013, with English translation.

Chinese Office Action issued for corresponding Chinese Patent Application No. 201010557845.2, issued on Sep. 4, 2013, with full translation.

Decision of Rejection issued for corresponding Chinese Patent Application No. 201010557845.2, dated Feb. 8, 2014, with an English translation.

* cited by examiner

"RELATED ART"

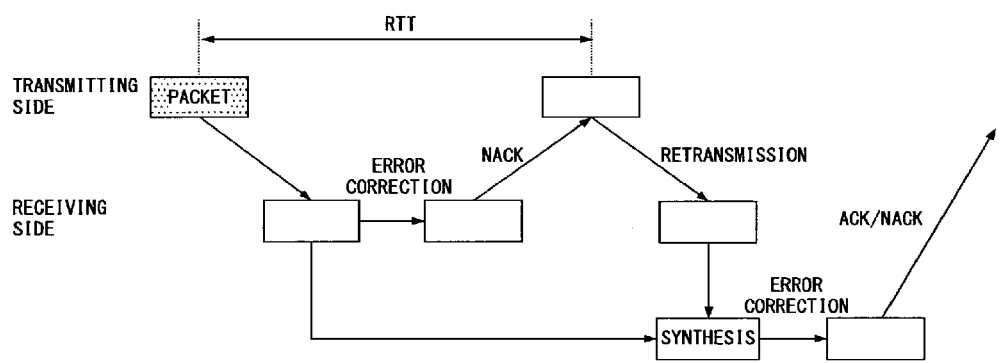
"RELATED ART"
F I G. 2

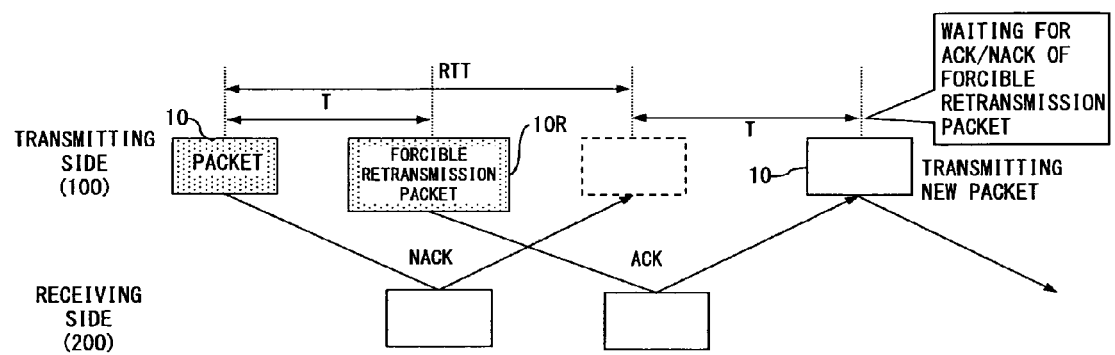
F I G. 3

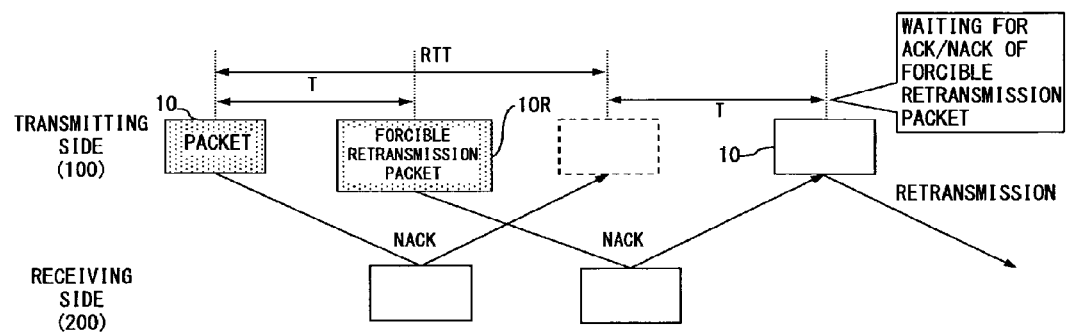
F I G. 4

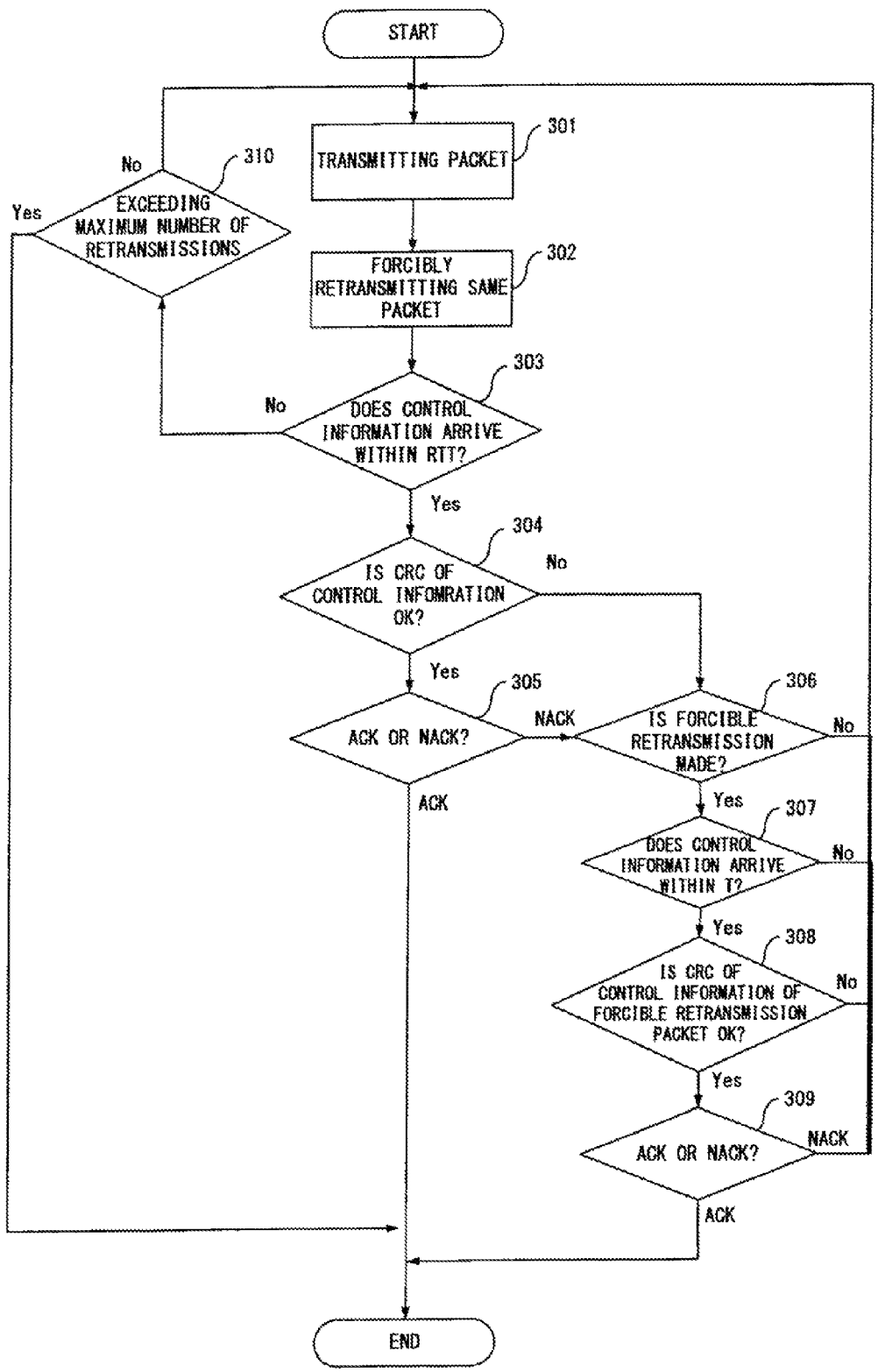
F I G. 7

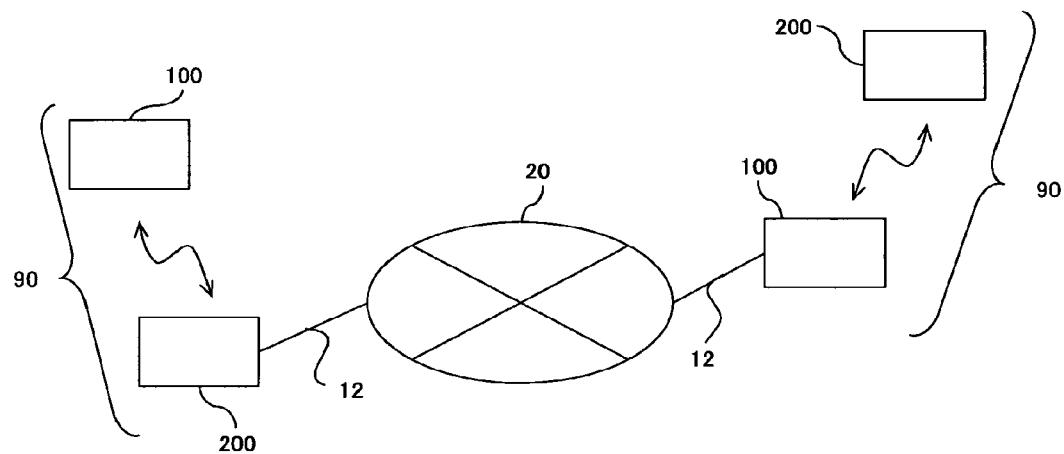
F I G. 1 0

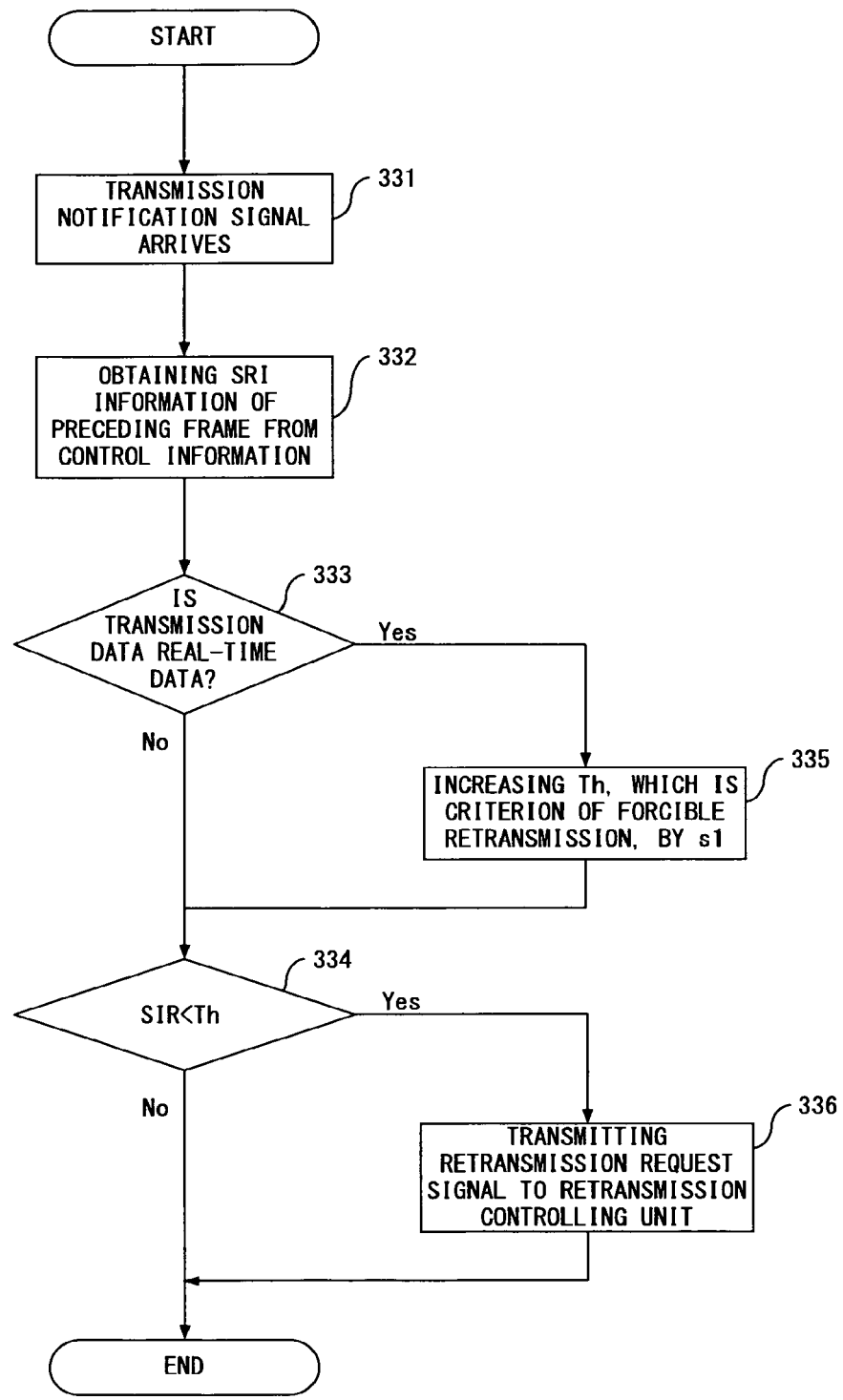
F I G. 1 7

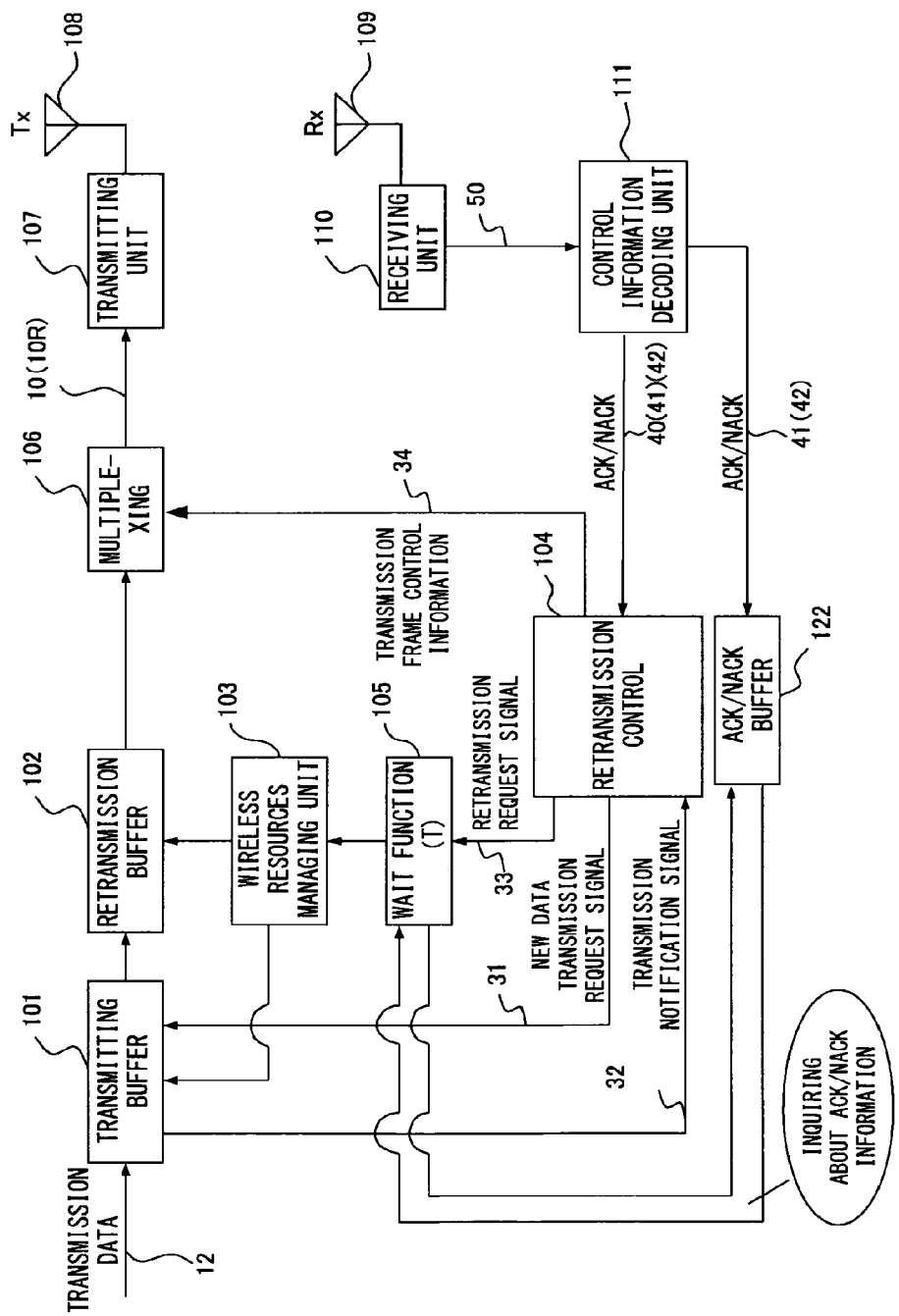
F I G. 20

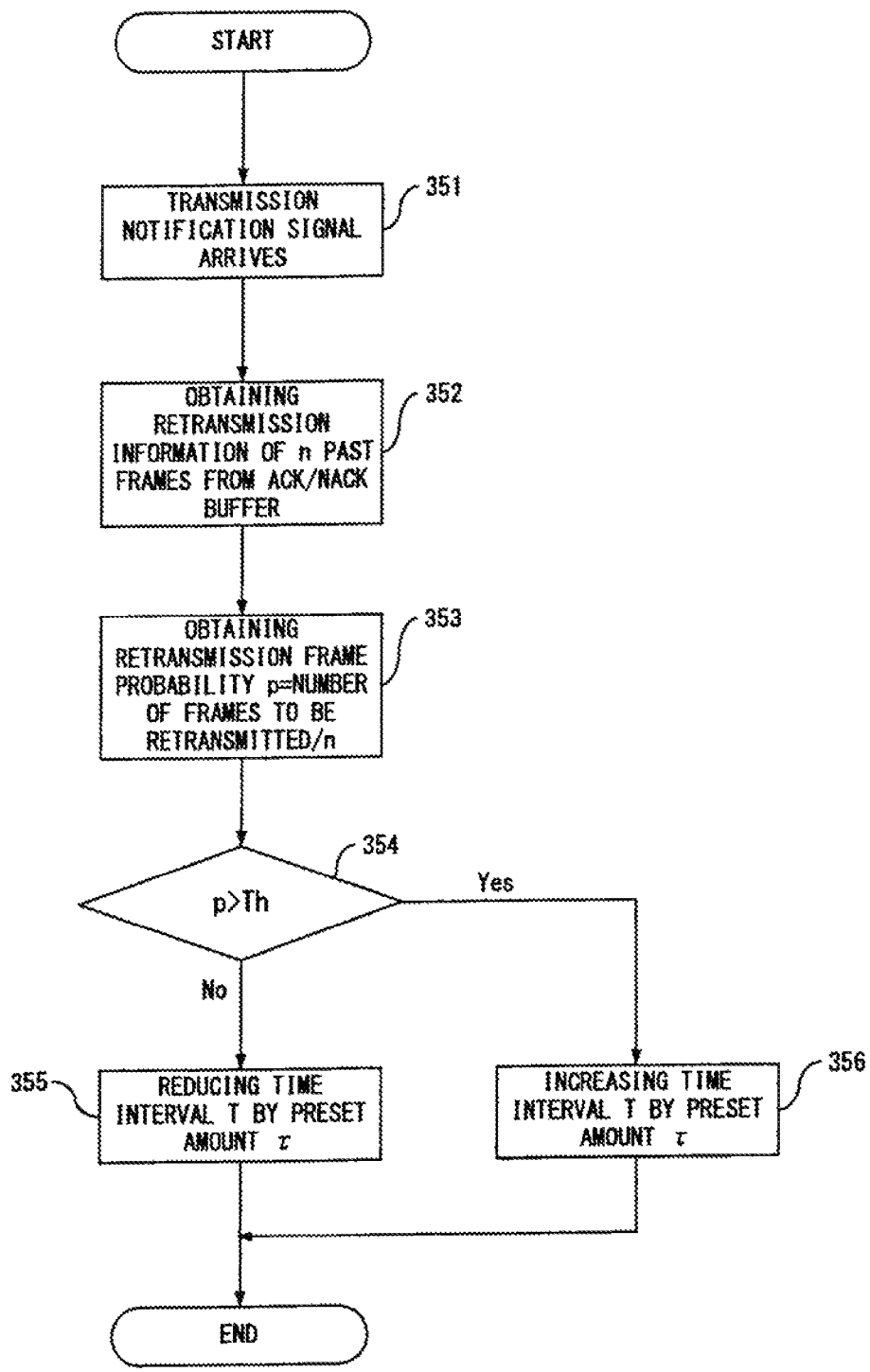
F I G. 21

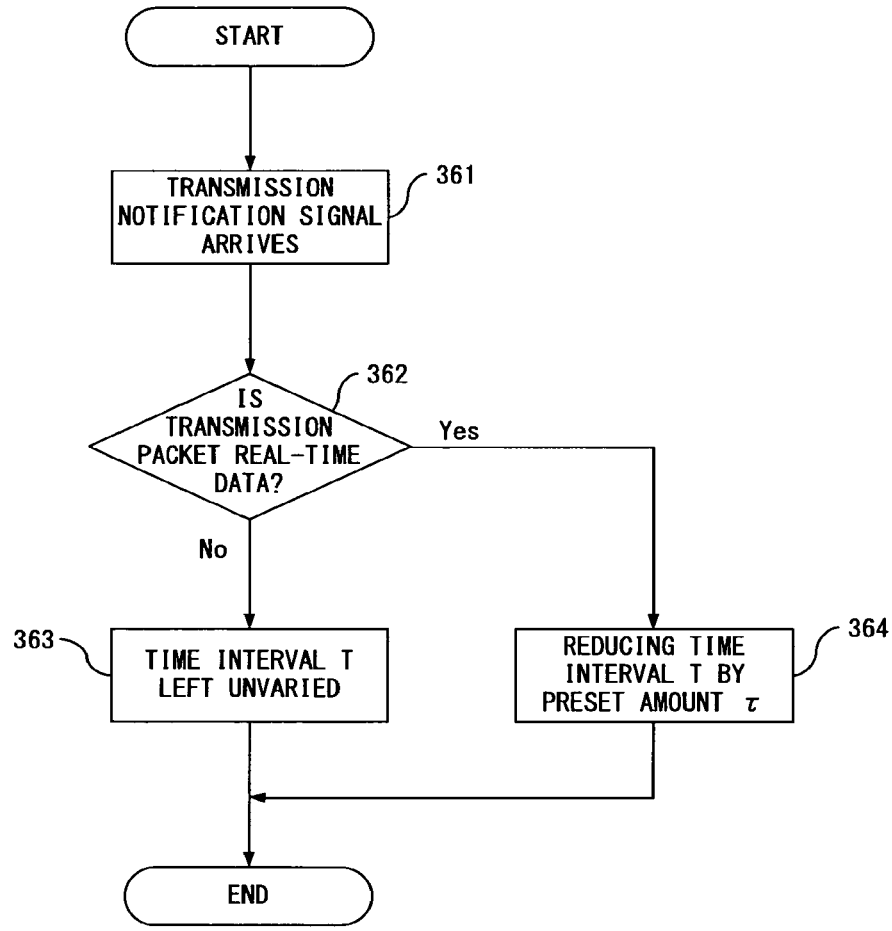
F I G. 2 3

WIRELESS COMMUNICATION SYSTEM AND RETRANSMISSION METHOD

CROSS REFERENCE TO RELATED APPLICATION

This present application is a continuation of U.S. application Ser. No. 12/003,823, filed on Jan. 2, 2008, now U.S. Pat. No. 7,869,463, which is a continuation of International Application No. PCT/JP2005/012677, filed on Jul. 8, 2005, the contents of each are herein wholly incorporated by reference.

BACKGROUND OF THE INVENTION

1. Field of the Invention

The present invention relates to a transmitting apparatus, a receiving apparatus, and an information communication method, and more particularly, to an effective technique applied to a retransmission control technique, etc. in transmitting and receiving apparatuses that configure a wireless communication system.

2. Description of the Related Art

The demand for realizing a high-speed and large-capacity communication has been increasing in order to implement services such as transmission/reception of large-capacity data except for voice, and image data of high definition in a mobile communication field typified by a cellular phone, etc. A technique for compensating for an error in a wireless transmission section is essential to a current wireless communication, which takes a high-speed and large-capacity communication into account, in order to improve its throughput. An automatic retransmission control method (ARQ: Automatic Repeat reQuest) exists as an important error compensation technique for improving a throughput. FIG. 1 shows a conceptual drawing showing the action of ARQ that is a conventional retransmission control method. With ARQ, error detection is made for each packet by using an error detection code such as a CRC (Cyclic Redundancy Check) code, which is appended to a transmission packet, the transmission of the next packet is requested by returning an ACK signal to a transmitting side if a received packet does not have an error, or the retransmission of the packet is requested by returning a NACK (Not-ACKnolwedge) signal if the received packet has an error.

HARQ (Hybrid-ARQ) exists as one type of ARQ. Here, a description is provided by taking as an example HARQ using a packet synthesis, which is referred to in Non-patent Document 1, among HARQ methods. Hereinafter, HARQ is assumed to indicate HARQ using a packet synthesis in this paragraph. FIG. 2 is a conceptual drawing showing the principle of the HARQ method. With the HARQ, error detection is made for each frame by using a CRC, which is appended to the end of a transmission frame, or the like after an error correction is made. If an error is detected, a NACK signal is returned to a transmitting side, and the retransmission of the entire frame is requested. At this time, a receiving side stores in a buffer the reception signal of the frame from which the error is detected. With the HARQ, the reception result of a retransmitted frame and the reception signal of the initially transmitted frame are synthesized. As a result, the reception characteristic can be further improved by using soft-determination information of the initial frame.

With conventional retransmission control methods such as HARQ, a retransmission is controlled by using an acknowledgment wait time called RTT (Round Trip Time). RTT is the sum of a time during which a packet arrives from a transmitting side to a receiving side, a time during which whether or not a packet is successfully received by the receiving side is determined, and a time during which ACK/NACK, which indicates an acknowledgement result, arrives from the receiving side to the transmitting side. A predetermined value is used as the RTT. The transmitting side transmits new data after a predetermined RTT elapses from the transmission of the initial data if an ACK signal arrives from the receiving side within the predetermined RTT, or retransmits the data after the RTT elapses if a NACK signal arrives. Or, if ACK or NACK does not arrive within the RTT, the transmitting side retransmits the packet to the receiving side.

In a next-generation mobile communication, it is anticipated that (objective 1) a seamless connection with a wired network, and (objective 2) a large-capacity wireless transmission at a transmission rate as high as 1 Gbps will be realized. To achieve (objective 1), TCP (Transmission Control Protocol), which is widely used as a transmission protocol of a wired network, must be implemented in a wireless network. TCP fundamentally observes congestion within a network, and gradually increases a transmission rate if congestion does not occur, or decreases the transmission rate to a minimum if congestion occurs. Whether or not congestion occurs is determined based on a packet loss.

The following problem is posed when TCP is used for a wireless system. TCP determines that a packet loss occurs if ACK is not returned from a receiving side to a transmitting side within a preset timeout period. However, a delay time is long in a wireless environment compared with a wired environment, leading to an increase in the probability that the timeout period of TCP expires and a packet loss is determined to occur. As a result, TCP determines that the packet loss is caused by congestion, and strictly restricts the inflow amount of data into a network. Therefore, a system throughput tends to be degraded if TCP is applied to a wireless environment. This is a serious problem when a large-capacity transmission at high speed is realized (objective 2). To improve degradation in a throughput, an improvement in TCP protocol, and a reduction in a delay time in a wireless environment are considered to be possible solutions. The latter is focused here.

A delay that occurs at the time of a retransmission process is considered as one factor of a processing delay in a wireless environment. With a conventional method for controlling a retransmission by using RTT, a considerable amount of time is required to transmit/retransmit new data depending on the value of RTT, and a retransmission delay increases if the retransmission is repeated, leading to degradation in a system throughput.

Patent Document 1 discloses as a conventional technique the technique for ensuring a sufficient call connection ratio while suitably maintaining the traffic of a general calling channel by varying the number of times that a call signal is retransmitted from a base station to a mobile station for each of a plurality of wireless areas having different line qualities such as fading, interference, etc. However, this document does not refer to the above described technical problem in the retransmission control of communication data itself.

Non-patent Document 1: D. Chase, "Code Combining—A Maximum-Likelihood Decoding Approach for Combining an Arbitrary Number of Noisy Packets", IEEE TRANSACTIONS ON COMMUNICATIONS, VOL. COM-33, NO. 5, MAY 1985

Patent Document 1: Japanese Published Unexamined Patent Application No. H10-13331

SUMMARY OF THE INVENTION

An object of the present invention is to provide at least either of: a communication technique that can shorten a retransmission delay time in the retransmission control of communication data; and a communication technique that can realize a wireless communication using the retransmission control of communication data without degrading a communication rate in a wireless communication network connected to a wired communication network in which the penalty of a communication rate due to a transmission delay is relatively strict.

Provided in a first aspect of the present invention is a transmitting apparatus that comprises a transmitting unit for transmitting communication data to a receiving apparatus, a receiving unit for receiving a negative acknowledgement signal or an acknowledgement signal, which is returned for the communication data from the receiving apparatus, a retransmission controlling unit for making a retransmission of the communication data to the receiving apparatus without waiting for the arrival of the negative acknowledgement signal from the receiving apparatus, or the elapse of a predetermined acknowledgement wait time, and a retransmission wait time controlling unit for controlling a time interval from a transmission of the communication data to the retransmission.

Provided in a second aspect of the present invention is the transmitting apparatus recited in the first aspect, which further comprises an allocation controlling unit for controlling allocation of wireless resources, and in which the retransmission of the communication data is made if the wireless resources are available.

Provided in a third aspect of the present invention is the transmitting apparatus recited in the first aspect, in which the retransmission controlling unit controls whether or not to make the retransmission, or a plurality of successive retransmissions based on an attribute of the communication data.

Provided in a fourth aspect of the present invention is the transmitting apparatus recited in the first aspect, which further comprises a predicting unit for predicting an occurrence of a retransmission of the communication data according to the state of a communication with the receiving apparatus, and for controlling whether or not to make the retransmission in the retransmission controlling unit based on a result of prediction.

Provided in a fifth aspect of the present invention is the transmitting apparatus recited in the first aspect, which further comprises a predicting unit for predicting an occurrence of a retransmission of the communication data based on the occurrence frequency of a retransmission process of past communication data, and for controlling whether or not to make the retransmission in the retransmission controlling unit based on a result of prediction.

Provided in a sixth aspect of the present invention is the transmitting apparatus recited in the first aspect, which further comprises a predicting unit for predicting an occurrence of a retransmission of the communication data based on the state of an information transmission path to the receiving apparatus, and for controlling whether or not to make the retransmission in the retransmission controlling unit based on a result of prediction.

Provided in a seventh aspect of the present invention is the transmitting apparatus recited in the first aspect, in which the retransmission wait time controlling unit controls the length of the time interval based on at least one of the attribute of the communication data, the state of an information transmission path to the receiving apparatus, and the frequency of a retransmission of past communication data.

Provided in an eighth aspect of the present invention is a receiving apparatus, which comprises a receiving unit for receiving communication data arriving from a transmitting apparatus, a transmitting unit for transmitting an acknowledgement signal or a negative acknowledgement signal of the communication data to the transmitting apparatus based on whether or not the communication data is successfully received, a storing unit for storing a result of the transmission of the acknowledgement signal, and a control information generating unit for returning the acknowledgement signal to the transmitting apparatus without executing a decoding process of the communication data if the acknowledgement signal is stored in the storing unit, upon receipt of the communication data retransmitted from the transmitting apparatus.

Provided in a ninth aspect of the present invention is the receiving apparatus recited in the eighth aspect, which further comprises a retransmission buffer for holding the communication data from which an error is detected, and a retransmission synthesizing unit for executing a decoding process of the communication data based on the communication data held in the retransmission buffer, and the retransmitted communication data if the acknowledgement signal is not stored in the storing unit.

Provided in a tenth aspect of the present invention is an information communication method, which is executed on a transmitting side and comprises a first step of transmitting communication data to a receiving side, and a second step of retransmitting the communication data to the receiving side without waiting for the arrival of a negative acknowledgement signal of the communication data arriving from the receiving side, or the elapse of a predetermined acknowledgement wait time.

Provided in an eleventh aspect of the present invention is the information communication method recited in the tenth aspect, in which the communication data is transmitted if wireless resources between the transmitting side and the receiving side are available, in the second step.

Provided in a twelfth aspect of the present invention is the information communication method recited in the tenth aspect, in which the possibility of occurrence of a request, which is made from the receiving side, to retransmit the communication data transmitted in the first step is predicted, and the communication data is transmitted if the possibility is high and wireless resources between the transmitting side and the receiving side are available, in the second step.

Provided in a thirteenth aspect of the present invention is the information communication method recited in the tenth aspect, in which the possibility of occurrence of a request, which is made from the receiving side, to retransmit the communication data transmitted in the first step is predicted based on the occurrence frequency of a retransmission process of past communication data, and the communication data is transmitted if the possibility is high and wireless resources between the transmitting side and the receiving side are available, in the second step.

Provided in a fourteenth aspect of the present invention is the information communication method recited in the tenth aspect, in which the possibility of occurrence of a request, which is made from the receiving side, to retransmit the communication data transmitted in the first step is predicted based on the quality of an information transmission path between the transmitting side and the receiving side, and the communication data is transmitted if the possibility is high and wireless resources between the transmitting side and the receiving side are available, in the second step.

Provided in a fifteenth aspect of the present invention is the information communication method recited in the tenth aspect, in which whether or not to retransmit the communication data is determined based on the immediacy of the communication data, in the second step.

Provided in a sixteenth aspect of the present invention is the information communication method recited in the tenth aspect, in which the communication data is transmitted by a plural number of times based on the immediacy of the communication data, in the second step.

Provided in a seventeenth aspect of the present invention is the information communication method recited in the tenth aspect, in which a retransmission time interval from the transmission of the communication data in the first step until the retransmission of the communication data in the second step is varied based on the quality of an information transmission path between the transmitting side and the receiving side, in the second step.

Provided in an eighteenth aspect of the present invention is the information communication method recited in the tenth aspect, in which a retransmission time interval from the transmission of the communication data in the first step until the retransmission of the communication data in the second step is varied based on the occurrence frequency of a retransmission process of past communication data, in the second step.

Provided in a nineteenth aspect of the present invention is the information communication method recited in the tenth aspect, in which a retransmission time interval from the transmission of the communication data in the first step until the retransmission of the communication data in the second step is varied according to the immediacy of the communication data, in the second step.

Provided in a twentieth aspect of the present invention is the information communication method recited in the tenth aspect, which is executed on the receiving side and further comprises a first step of receiving communication data arriving from the transmitting side, and of returning an acknowledgement signal to the transmitting side if the communication data is successfully received, or of returning a negative acknowledgement signal to the transmitting side and storing a result of acknowledgement if the communication data is unsuccessfully received, and a second step of suppressing the decoding process of the communication data, and of returning an acknowledgement signal to the transmitting side if the acknowledgement signal is stored as the acknowledgement result in the first step, upon receipt of the communication data retransmitted from the transmitting side.

BRIEF DESCRIPTION OF THE DRAWINGS

FIG. 2 is a conceptual drawing showing the principle of a conventional HARQ method;

FIG. 3 is a conceptual drawing explaining a principle common to information communication methods according to preferred embodiments of the present invention;

FIG. 4 is a conceptual drawing explaining a principle common to the information communication methods according to the preferred embodiments of the present invention;

FIG. 7 is a flowchart showing one example of the action of a transmitting side, which is common to the information communication methods according to the preferred embodiments of the present invention;

FIG. 10 is a conceptual schematic showing one example of a configuration of a communication system to which a communication method according to the preferred embodiment of the present invention is applied;

FIG. 17 is a flowchart showing the action of the modification example of the transmitting apparatus exemplified in FIG. 16;

FIG. 20 is a block diagram showing a configuration of a modification example of the transmitting apparatus according to the further preferred embodiment of the present invention;

FIG. 21 is a flowchart showing the action of the modification example of the transmitting apparatus exemplified in FIG. 20;

FIG. 23 is a flowchart showing the action of the modification example of the transmitting apparatus exemplified in FIG. 22.

DESCRIPTION OF THE EMBODIMENTS

Figure 1:
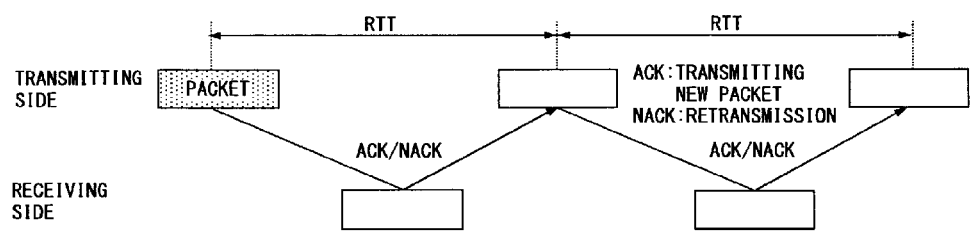
FIG. 1 is a conceptual drawing showing the action of ARQ that is a conventional retransmission control method.

Preferred embodiments according to the present invention are described in detail below with reference to the drawings.

A principle, which is common to communication methods, transmitting apparatuses, and receiving apparatuses according to the preferred embodiments, is initially described with reference to FIG. 3. With the conventional ARQ method, a retransmission is made after an acknowledgement wait time (RTT) elapses after transmitting a new packet as shown in the above described FIG. 1. In the meantime, a forcible retransmission packet 10R, the communication data portion of which is the same as the initial packet 10, is forcibly retransmitted (referred to as a "forcible retransmission" in this specification) after a time interval T (T<RTT) is waited in the preferred embodiments of the present invention. The time interval T is varied based on propagation path information, the frequencies of retransmissions of several past packets, immediacy that is one of indexes of QoS (Quality of Service) of a transmission packet, and the like. As a result, the possibility that a forcibly retransmitted packet can be properly decoded on a receiving side is increased by using time diversity more effectively.

A retransmission processing method when a forcible retransmission is actually made is described below. Here, it is assumed that a CRC (Cyclic Redundancy Check) code is appended when ACK/NACK is returned from a receiving side to a transmitting side, and that a packet is handled as NACK if the CRC becomes an error on the transmitting side.

A case where the initially transmitted packet is erroneously decoded on the receiving side is considered first. Since the transmitting side makes a forcible retransmission after the time interval T elapses from the transmission of a new packet 10, a forcible retransmission packet 10R arrives at the receiving side after T elapses from the arrival of the new packet 10. The receiving side decodes the forcible retransmission packet 10R, and returns ACK (acknowledgement signal) if the reception is successfully made, or returns NACK (negative acknowledgement signal) to the transmitting side if the reception is unsuccessfully made, according to a result of the decoding. The transmitting side does not immediately make a retransmission upon receipt of NACK of the new packet 10, and waits for ACK/NACK of the forcible retransmission packet 10R. A state where the forcible retransmission packet 10R is correctly decoded is shown in FIG. 3. Only a time of RTT+T is required until the next new data is transmitted with this method although a minimum of 2×RTT is required until the new data is transmitted with the above described conventional method shown in FIG. 1. Accordingly, a processing delay of RTT-T or more can be reduced. An inverse state where the forcible retransmission packet 10R is erroneously decoded is shown in FIG. 4. In this case, a retransmission is made when NACK of the forcible retransmission packet 10R arrives. Similar processes are repeated hereafter.

A case where the initially transmitted packet is correctly decoded on the receiving side is considered next. The forcible retransmission packet 10R arrives at the receiving side after T elapses from the arrival of the new packet 10. Since the new packet 10 is correctly decoded, the receiving side returns ACK to the transmitting side upon arrival of the forcible retransmission packet 10R without the need for decoding this packet.

Figure 5:
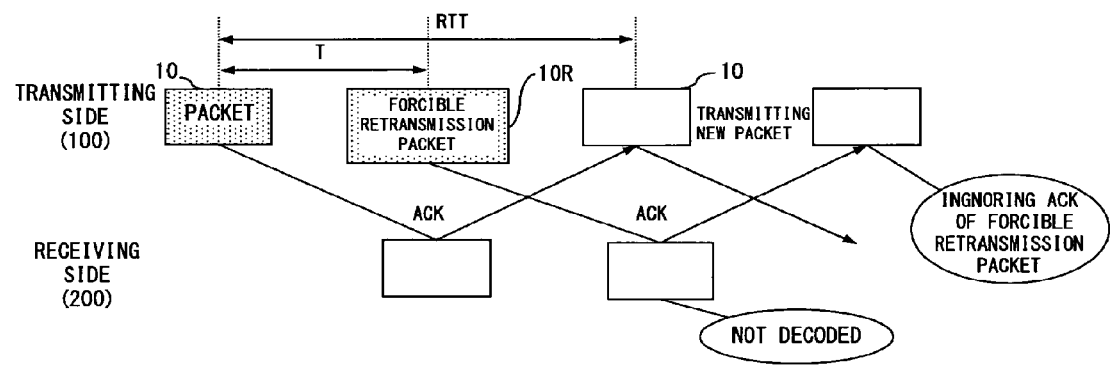
FIG. 5 is a conceptual drawing explaining a principle common to the information communication methods according to the preferred embodiments of the present invention.

A case where ACK of the new packet 10 is correctly conveyed to the transmitting side is shown in FIG. 5. In this case, the new packet 10 is transmitted upon arrival of the initial ACK, and no operation is performed upon arrival of ACK of the forcible retransmission packet 10R.

Figure 6:
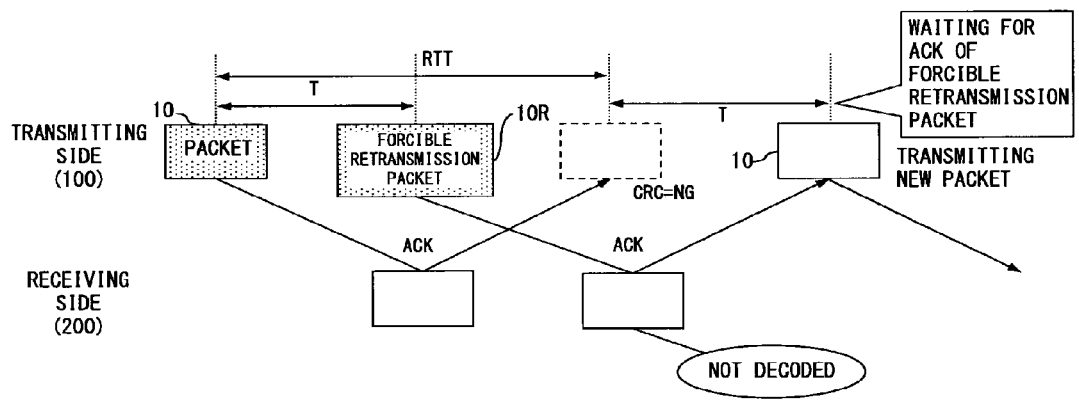
FIG. 6 is a conceptual drawing explaining a principle common to the information communication methods according to the preferred embodiments of the present invention.

Also a case where ACK of the new packet 10 is erroneously conveyed to the transmitting side is shown in FIG. 6. In this case, the new packet 10 is transmitted after waiting for the arrival of ACK of the forcible retransmission packet 10R. Also in this case, a processing delay of RTT-T or more can be reduced.

Figure 8:
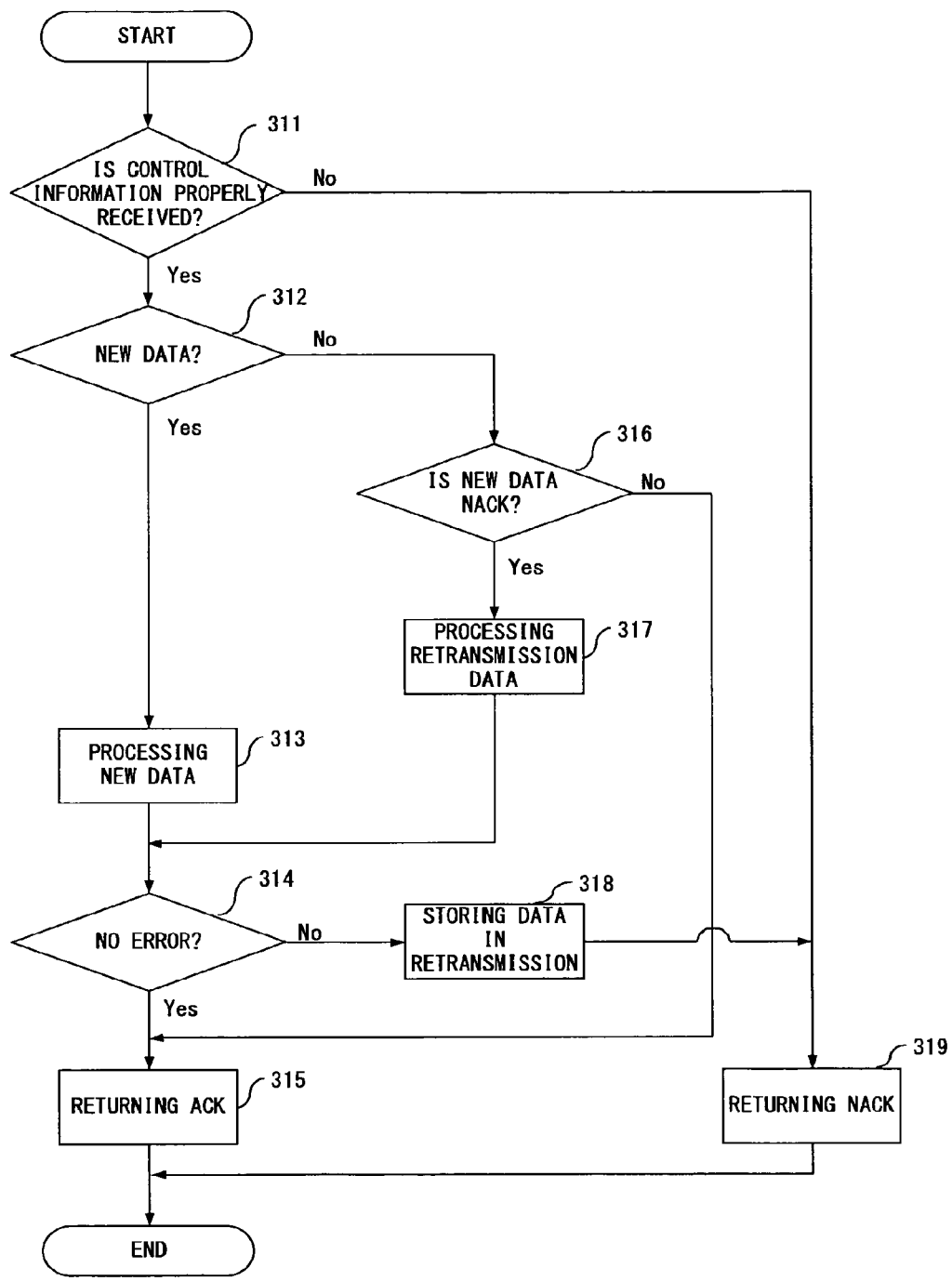
FIG. 8 is a flowchart showing one example of the action of a receiving side, which is common to the information communication methods according to the preferred embodiments of the present invention.

The above described four cases are summarized as flowcharts shown in FIGS. 7 and 8 respectively for the transmitting and receiving sides. FIGS. 7 and 8 also explain a case where control information is erroneous.

A specific example of a method, which is shown in FIG. 8, for making a distinction between the new packet 10 and the forcible retransmission packet 10R is described below. Namely, an SN (Sequential Number) is added to a packet, which is then transmitted. At this time, the transmitting side updates the SN when transmitting the new packet 10, or maintains the SN when retransmitting the forcible retransmission packet 10R. The receiving side checks the SN, whereby the distinction between the new packet 10 and the forcible retransmission packet 10R can be made.

Figure 9:
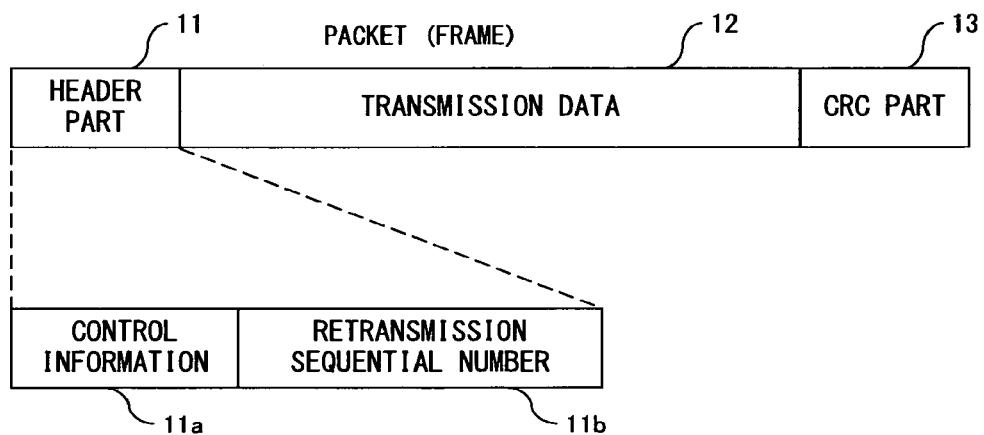
FIG. 9 is a conceptual drawing showing one example of a structure of a packet in an information communication according to a preferred embodiment of the present invention.

The packet 10 (forcible retransmission packet 10R) exemplified in FIG. 9 includes transmission frame control information 11 as a header part, transmission data 12 that is data itself to be transmitted, and a CRC part 13 including error correction information of the transmission frame control information 11 and the transmission data 12.

The transmission frame control information 11 includes control information 11a composed of addresses of the destination and the source of the packet 10 (forcible retransmission packet 10R), information about line quality, etc., and a retransmission sequential number 11b equivalent to the above described SN (Sequential Number). The retransmission sequential number 11b and the transmission data 12 of the packet and those of the forcible retransmission packet 10R corresponding to the packet 10 are mutually equal.

In the above provided description, a forcible retransmission is made after the time interval T is waited. However, a forcible retransmission can be also made without waiting for the time interval T if wireless resources are available when the retransmission processing method is applied to a system where wireless resources are managed at the time of a transmission.

Also a forcible retransmission can be made after predicting the possibility that a packet is required to be retransmitted in order to reduce a useless retransmission and prevent transmission power from being wasted in this system. The possibility of retransmission is predicted based on the frequencies of retransmissions of several past packets, propagation path information, etc.

If real-time data is transmitted in a system that makes a forcible retransmission after making this prediction, a determination of whether or not to make a forcible retransmission by also taking immediacy, which is one of the indexes of QoS (Quality of Service) of data, into account may be made. For data that requires immediacy, the possibility that the forcible retransmission is made is increased by changing the setting of the criterion of the determination of the retransmission possibility. In this way, the probability of the forcible retransmission is increased although some useless retransmissions can be possibly made, leading to significant reductions in a retransmission processing delay.

Also a method for making a forcible retransmission by a predetermined number of times without making a prediction if the degree of urgency of QoS is high is considered as a method for taking QoS into account. In this way, even a time required for a prediction can be saved although transmission power consumption increases. As a result, a processing delay can be further reduced.

Compared with the conventional method, the number of retransmissions per unit time increases with the above described methods. Therefore, a maximum number of retransmissions is reached more quickly in a system for which the maximum number of retransmission is set, whereby a useless delay can be prevented at that time point. Additionally, if the above described methods are used along with a method such as HARQ, etc., reception can be made more quickly without an error on a receiving side by using a retransmission synthesis. Accordingly, the possibility that decoding is correctly made within a restricted time increases in a system for which a retransmission timeout period, etc. is set.

First Preferred Embodiment

Figure 11:
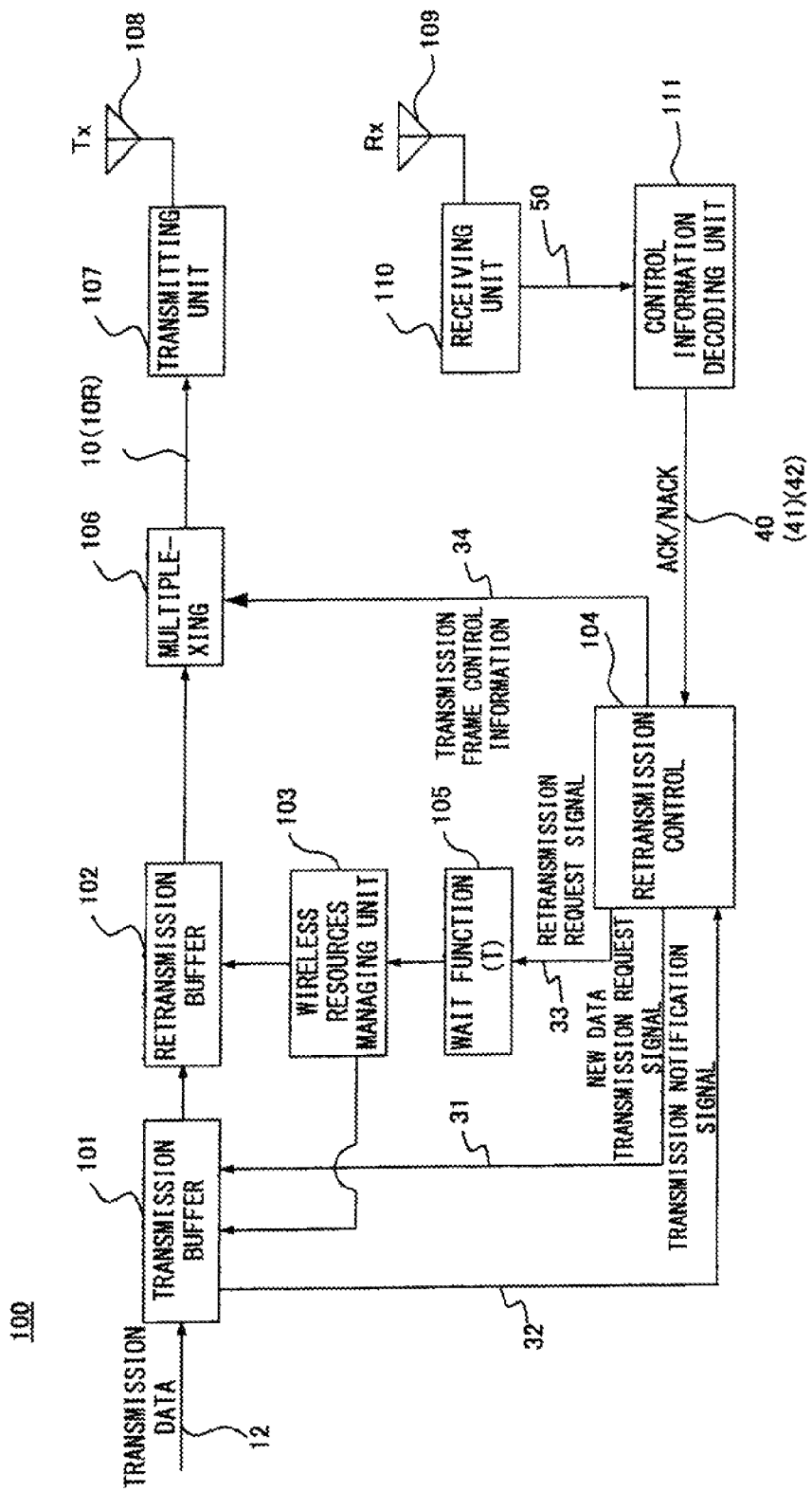
FIG. 11 is a block diagram showing one example of a configuration of a transmitting apparatus that carries out the information communication method according to the preferred embodiment of the present invention.
Figure 12:
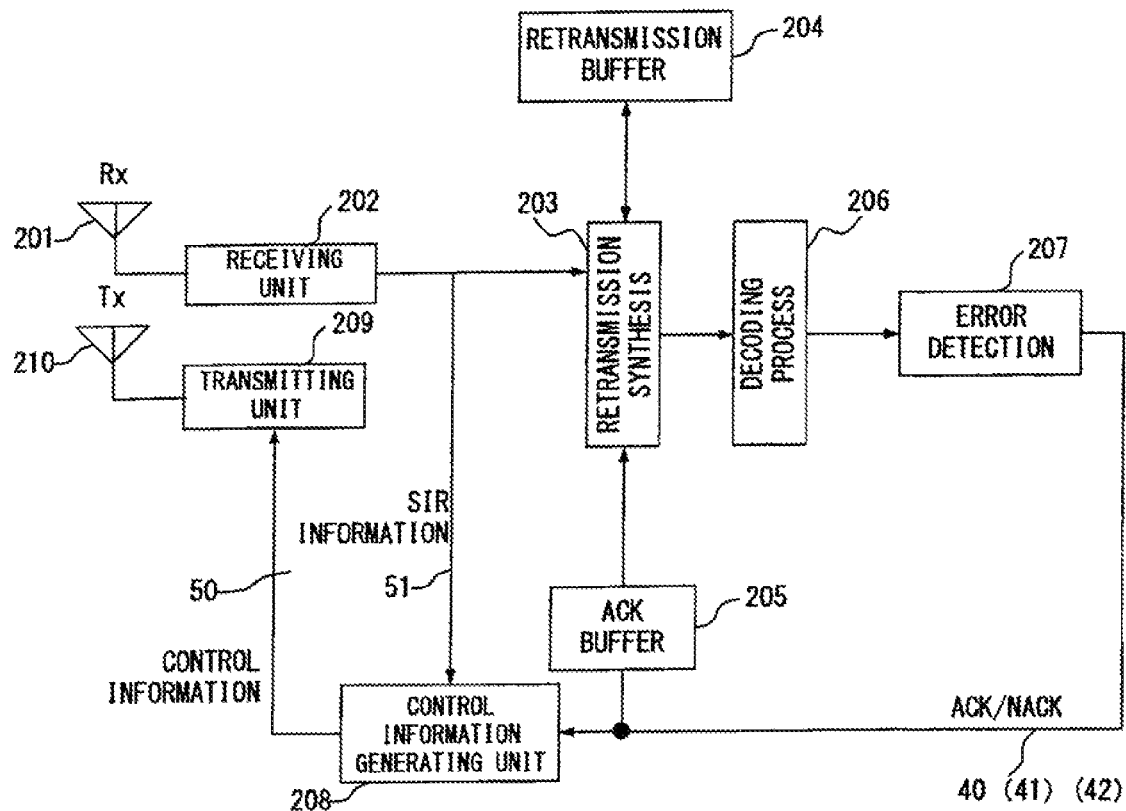
FIG. 12 is a block diagram showing one example of a configuration of a receiving apparatus that carries out the information communication method according to the preferred embodiment of the present invention.

FIG. 10 is a conceptual drawing showing one example of a configuration of a communication system to which a communication method according to this preferred embodiment is applied, FIG. 11 is a block diagram showing one example of a configuration of a transmitting apparatus that carries out the information communication method according to this preferred embodiment, and FIG. 12 is a block diagram showing one example of a configuration of a receiving apparatus that carries out the information communication method according to this preferred embodiment.

As exemplified in FIG. 10, the transmitting apparatus 100 and the receiving apparatus 200 according to this preferred embodiment configure a wireless communication system 90 using HARQ as a retransmission control method, mutually make a wireless communication, and are connected to a wired communication network 20 that makes an information communication. The wired communication network 20 and the wireless communication system 90 are seamlessly connected, for example, by using communication protocols such as TCP/IP, etc.

As exemplified in FIG. 11, the transmitting apparatus 100 according to this preferred embodiment comprises a transmission buffer 101, a retransmission buffer 102, a wireless resources managing unit 103, a retransmission controlling unit 104, a wait functioning unit 105, a multiplexing unit 106, a transmitting unit 107, a transmission antenna 108 (Tx), a reception antenna 109 (Rx), a receiving unit 110, and a control signal decoding unit 111.

The transmission buffer 101 is a buffer for temporarily holding transmission data 12. The retransmission buffer 102 is a buffer for holding transmitted transmission data 12 in order for a forcible retransmission.

The wireless resources managing unit 103 executes a process for allocating wireless resources (any of a frequency, a code and a time slot, or their combination) used when the transmission data 12 in the transmission buffer 101, or the transmitted transmission data 12 in the retransmission buffer 102 is transmitted.

The multiplexing unit 106 executes a process for configuring the packet 10 and the forcible retransmission packet 10R by adding the transmission frame control information 11 and the CRC part 13, which are exemplified in the above described FIG. 9, to the beginning and the end of the transmission data 12.

The transmitting unit 107 executes a process for converting the data of the packet 10 or the forcible retransmission packet 10R into an electromagnetic wave, and for emitting the wave from the transmission antenna 108.

The receiving unit 110 executes a process for converting an electromagnetic wave received by the reception antenna 109 into digital data, for extracting control information 50, and for inputting the extracted information to the control signal decoding unit 111.

The control signal decoding unit 111 decodes a retransmission control signal 40 from the control information 50 input from the receiving unit 110, and inputs the decoded signal to the retransmission controlling unit 104 to be described later. The retransmission control signal 40 is composed of an ACK signal 41 or a NACK signal 42. The ACK signal 41 is an acknowledgment signal returned from a receiving side if the receiving side (the receiving apparatus 200 to be described later) successfully receives the packet 10. The NACK signal 42 is a negative acknowledgement signal returned from the receiving side when the receiving side (the receiving apparatus 200 to be described later) unsuccessfully receives the packet 10.

The retransmission controlling unit 104 outputs a new data transmission request signal 31, which provides the timing when the transmission data 12 stored in the retransmission buffer 102 is output as the packet 10, to the retransmission buffer 102. In the meantime, a transmission notification signal is input from the transmission buffer 101 to the retransmission controlling unit 104 at the timing of the transmission of the transmission data 12.

The retransmission controlling unit 104 inputs transmission frame control information 34 to the multiplexing unit 106. The transmission frame control information 34 includes the transmission frame control information 11 that is exemplified in the above described FIG. 9 and used to configure the packet 10 or the forcible retransmission packet 10R.

The retransmission controlling unit 104 outputs a retransmission request signal 33 to the wireless resources managing unit 103, so that a retransmission process is executed.

In this preferred embodiment, the wait functioning unit 105 is provided between the retransmission controlling unit 104 and the wireless resources managing unit 103.

The wait functioning unit 105 performs an operation for inputting the retransmission request signal 33 input from the retransmission controlling unit 104 by delaying the signal by the above described time interval T.

Conventionally, as shown in the above described FIG. 1, the retransmission controlling unit 104 waits for the arrival of the retransmission control signal 40 from the receiving side from the detection of the transmission notification signal 32 for the above described RTT, and executes the retransmission process of the packet 10 by inputting the retransmission request signal 33 to the wireless resources managing unit 103 after the RTT elapses, or upon arrival of the NACK signal 42 during the RTT.

In the meantime, in the transmitting apparatus 100 according to this preferred embodiment, the retransmission controlling unit 104 transmits the forcible retransmission packet 10R to the receiving side by inputting the retransmission request signal 33 to the wireless resources managing unit 103 via the wait functioning unit 105 as exemplified in the above described FIGS. 3, 4, 5, and 6 regardless whether or not the retransmission control signal 40 (the ACK signal 41 or the NACK signal 42) arrives from the receiving side after detecting the transmission notification signal 32.

Namely, in this preferred embodiment, the forcible retransmission packet 10R is forcibly retransmitted after the delay of the above described time interval T, which is controlled by the wait functioning unit 105, before the RTT elapses after the transmission of the new packet 10, and moreover, regardless of whether or not the ACK signal 41 or the NACK signal 42, which corresponds to the packet 10, is received from the receiving side.

In contrast, as exemplified in FIG. 12, the receiving apparatus 200 according to this preferred embodiment comprises a reception antenna 201 (Rx), a receiving unit 202, a retransmission synthesizing unit 203, a retransmission buffer 204, an ACK buffer 205, a decoding unit 206, an error detecting unit 207, a control information generating unit 208, a transmitting unit 209, and a transmission antenna 210 (Tx).

The reception antenna 201 converts an electromagnetic wave received from the transmitting apparatus 100 into digital data, and inputs the converted data to the retransmission synthesizing unit 203 and the control information generating unit 208.

The retransmission synthesizing unit 203 executes a process for storing data arriving from the receiving unit 202 in the retransmission buffer 204 depending on need, and a process for superimposing data held in the retransmission buffer 204 on the data arriving from the receiving unit 202.

The decoding unit 206 executes the decoding process of data input from the retransmission synthesizing unit 203.

The error detecting unit 207 executes an error detection or correction process using the information of the CRC part 13 for data of the packet 10, the forcible retransmission packet 10R, etc., which is decoded by the decoding unit 206, and a process for outputting the ACK signal 41 if an error is not detected, or for outputting the NACK signal to the ACK buffer 205 and the control information generating unit 208 as the retransmission control signal 40 if an uncorrectable error is detected.

The ACK buffer 205 holds the ACK signal 41 output from the error detecting unit 207, and clears the holding state of the preceding ACK signal 41 if the NACK signal 42 arrives.

The above described retransmission synthesizing unit 203 references this ACK buffer 205, regards the preceding reception process as being failed if the ACK signal 41 is not stored in the ACK buffer 205, and executes a process for superimposing data of the retransmission buffer 209 on the data arriving from the receiving unit 202. Or, if the ACK signal 41 is stored in the ACK buffer 205, the retransmission synthesizing unit 203 regards the preceding reception process as being successfully executed, and suppresses the process for superimposing the data of the retransmission buffer 204 on the data arriving from the receiving unit 202.

The control information generating unit 208 executes a process for passing the retransmission control signal 40 (the ACK signal 41 or the NACK signal 42) input from the error detecting unit 207, the SIR information 51 obtained from the receiving unit 202, and various items of information about a communication state to the transmitting unit 209 as the control information 50, and for making a response to the transmitting apparatus 100 at the source of the packet 10 or the forcible retransmission packet 10R.

The SIR information 51 includes the value of SIR (Signal to Interference Ratio), which is actually measured by the receiving unit 202, of a wireless communications path between the transmitting apparatus 100 and the receiving apparatus 200.

The transmitting apparatus 209 executes a process for converting the control information 50 into an electromagnetic wave, and for transmitting the converted wave from the transmission antenna 210.

In the above described FIGS. 11 and 12, the transmitting apparatus 100 and the receiving apparatus 200 are separately depicted for the convenience of explanation. However, each of a plurality of information communication apparatuses that make an information communication may comprise a combination of the transmitting apparatus 100 and the receiving apparatus 200, and a bidirectional communication of the packet 10 may be made. In this case, each of the information communication apparatuses can be configured to share constituent elements such as the transmitting unit, the receiving unit, the antenna, etc., which are common to the transmitting apparatus 100 and the receiving apparatus 200. Namely, the transmitting apparatus 100 and the receiving apparatus 200 can respectively configure part of an information communication apparatus.

One example of the actions of the transmitting apparatus 100 and the receiving apparatus 200 in this preferred embodiment is described below.

In the transmitting apparatus 100, the transmission data 12 is stored in the transmission buffer 101, the transmission data 12 within the transmission buffer 101 is configured as the packet 10 at the timing of detection of the new data transmission request signal 31 from the retransmission controlling unit 109, and the packet 10 is transmitted via the multiplexing unit 106, the transmitting unit 107, and the transmission antenna 108.

Upon completion of this transmission, the transmission buffer 101 stores the transmission data 12 in the retransmission buffer 102, and inputs the transmission notification signal 32 to the retransmission controlling unit 109.

At this timing, the retransmission controlling unit 104 immediately outputs the retransmission request signal 33 to the wireless resources managing unit 103 via the wait functioning unit 105 without waiting for the elapse of RTT, and regardless of whether or not the retransmission control signal 40 is input from the control signal decoding unit 111. The wireless resources managing unit 103 transmits the forcible retransmission packet 10R, which is configured by using the same transmission data 12 stored in the retransmission buffer 102, via the multiplexing unit 106, the transmitting unit 107, and the transmission antenna 108 after the time interval T (<RTT), which is controlled by the wait functioning unit 105, elapses from the transmission of the initial packet 10, if the wireless resources are available. At this time, the values of the transmission data 12, the retransmission sequential number 11b, and address information, etc. of the control information 11a of the forcible retransmission packet 10R are the same as those of the original packet 10 as described above.

On the side of the receiving apparatus 200, the transmission data 12 coming from the transmitting apparatus 100 via the propagation path arrives at the reception antenna 201 (Rx), and the decoding process and the error determination process are executed for the reception signal via the receiving unit 202, the retransmission synthesizing unit 203, the decoding unit 206, and the error detecting unit 207. If an error is not detected by the error detecting unit 207, the ACK signal 41 is returned to the transmitting apparatus 100 at the source via the control information generating unit 208, the transmitting unit 209, and the transmission antenna 210 (Tx), and the signal is stored in the ACK buffer 205.

If the error is detected by the error detecting unit 207, the NACK signal 42 is returned to the transmitting apparatus 100 at the source via the control information generating unit 208, the transmitting unit 209, and the transmission antenna 210, and at the same time, the reception signal of the packet in which the error occurs is stored in the retransmission buffer 204, and prepared for a retransmission synthesis process to be executed later.

Namely, in the demodulation process of the receiving apparatus 200, if the ACK signal 41 is detected from the initially transmitted data (packet 10), this signal is stored in the ACK buffer 205, and the ACK signal 41 is returned to the transmitting apparatus 100 without demodulation the forcibly retransmitted forcible retransmission packet 10R even if the forcible retransmission packet 10R arrives. The receiving apparatus 200 returns the control information 50 composed of the ACK signal 41 or the NACK signal 42 and the SIR information 51 to the transmitting apparatus 100, and at the same time, the receiving apparatus 200 stores the reception signal of the frame (packet) in which the error occurs in the retransmission buffer 204, and prepares for the retransmission synthesis process.

In the transmitting apparatus 100, the ACK signal 41 or the NACK signal 42, which is decoded by the control signal decoding unit 111, is input to the retransmission controlling unit 104. The retransmission controlling unit 104 outputs the new data transmission request signal 31 if the input signal is the ACK signal 41, or transmits the retransmission request signal 33 to the retransmission buffer 102 via the wireless resources managing unit 103 if the input signal is the NACK signal 42. If the wireless resources are available, a retransmission signal is transmitted from the retransmission buffer 102.

This retransmission signal is synthesized with the signal stored in the retransmission buffer 204 in the preceding reception after being received on the side of the receiving apparatus 200, decoded by the decoding unit 206, and an error detection is made by the error detecting unit 207 after an error correction is made. Thereafter, similar processes are repeated until no error is detected on the receiving side, or until the number of retransmissions reaches a maximum number.

In the meantime, the number of retransmissions of the forcible retransmission packet 10R in the transmitting apparatus 100 may be predetermined, and the forcible retransmission packet 10R can be retransmitted successively by that number when being forcibly retransmitted.

The above described processes of the transmitting apparatus 100 are described with reference to the aforementioned flowchart of FIG. 7.

Initially, the forcible retransmission packet 10R including the transmission data 12 and the retransmission sequential number 11b, which are the same as those of the packet 10, is transmitted to the receiving apparatus 200 the moment when the time interval T (<RTT) elapses (step 302) after the new packet 10 including the transmission data 12 is transmitted to the receiving apparatus 200 (step 301).

If the control information 50 including the ACK signal 41 or the NACK signal 42, and the like is not returned from the side of the receiving apparatus 200 within RTT (step S303), steps 301 and 302 are repeated while the number of retransmissions does not exceed a preset maximum number (step 310). If the control information is returned within RTT, whether or hot an error exists in the returned control information 50 is determined (step 304).

If an error is detected in the control information 50, whether or not a forcible retransmission corresponding to the control information 50 is made (step 306), whether or not the control information arrives within T (step 307), whether or not an error exists in the control information 50 corresponding to the forcible retransmission packet 10R (step 308), and whether the control information 50 is either the ACK signal 41 or the NACK signal 42 (step 309) are determined.

If the forcible retransmission is determined not to be made in step 306, if the control information 50 is determined not to arrive within T in step 307, if an error is detected in the control information 50 corresponding to the forcible retransmission packet 10R in step 308, or if the control information 50 is determined to be the NACK signal 42 in step 309, the process goes back to step 301.

Or, if the forcible retransmission is determined to be made in step 306, if the control information 50 is determined to arrive within T in step 307, if an error is determined not to be detected in the control information 50 corresponding to the forcible retransmission packet 10R in step 308, and if the control information 50 is determined to be the ACK signal 41 in step 309, the transmission process of this packet 10 is terminated.

In the meantime, if an error is determined not to be detected in step 304, whether the returned control information 50 is either the ACK signal 41 or the NACK signal 42 is determined (step 305). If the control information 50 is determined to be the NACK signal 42, the process branches to the above described step 306, and the determination processes of the above described steps 306 to 309 are executed.

If the control information 50 is determined to be the ACK signal 41 in step 305, the transmission process of this packet 10 is terminated.

In the meantime, the process of the receiving apparatus 200 is as represented by the above described flowchart of FIG. 8. Initially, whether or not the control information 50 included in the transmission frame control information 11 of a received packet 10 is properly received is determined (step 311). If the control information 50 is determined to be improperly received, the NACK signal is returned to the side of the transmitting apparatus 100, and the process is terminated.

If the control information 50 is determined to be properly received in step 311, whether or not the packet 10 is the new packet is determined by referencing the retransmission sequential number 11b (step 312). If the packet is determined to be the new packet 10, the decoding unit 206 and the error detecting unit 207 execute the decoding process and the error detection process (step 313), and whether or not an error exists is determined (step 314). If the error is determined not to be detected, the ACK signal 41 is returned to the side of the transmitting apparatus 100, and at the same time, the ACK signal 41 is stored in the ACK buffer 205 (step 315). Then, the process is terminated.

If the error is determined to be detected in the above described step 314, the packet 10 is stored in the retransmission buffer 204 (step 318), the NACK signal 42 is returned to the transmitting apparatus 100 (step 319), and the process is terminated.

If the packet 10 is determined to be not the new packet 10 but the forcible retransmission packet 10R, whether or not the reception of the preceding packet 10 is unsuccessfully made (namely, whether or not the reception results in the NACK signal 42) is determined by referencing the ACK buffer 205 (step 316). If the reception is determined to be unsuccessfully made, the process of retransmission data (the forcible retransmission packet 10R), which is configured by using also the data of the retransmission buffer 204, is executed (step 317), and steps S314 and later are executed.

If the reception is determined to be successfully made (if the reception does not result in the NACK signal 42) in step 316, the ACK signal 41 is returned to the transmitting apparatus 100 (step 315), and the process is terminated.

As described above, in this preferred embodiment, the forcible retransmission packet 10R the contents of which is the same as the packet 10 is transmitted at the timing delayed by the time interval T (<RTT) after the transmission of the packet 10 regardless of whether or not the NACK signal 42 is received from the receiving apparatus 200 before RTT elapses in the transmitting apparatus 100. As a result, in all of the case where the initial packet 10 becomes an error (FIG. 3), the case where both of the packet 10 and the forcible retransmission packet 10R become errors (FIG. 4), and the case where the ACK signal 41, which is returned from the receiving apparatus 200 to the transmitting apparatus 100, becomes an error although the initial packet 10 is successfully received by the receiving apparatus 200 (FIG. 6), a retransmission can be started with the delay time of RTT+T. Therefore, the delay time until the start of a retransmission is shortened by RTT-T, and a retransmission delay time in the retransmission control of the transmission data 12 can be reduced compared with 2×RTT in the conventional technique shown in FIG. 1.

The forcible retransmission packet 10R is forcibly retransmitted after the packet 10, whereby a time required to reach the maximum number of retransmissions can be shortened, and a determination of whether or not to stop a transmission due to the bad condition of a communication line, and its measures can be started at an early stage.

In the meantime, on the side of the receiving apparatus 200, whether or not an error of the packet 10 is detected is stored in the ACK buffer 205, and the decoding process of a succeeding forcible retransmission packet 10R is suppressed if the initial packet 10 is successfully received. Therefore, power consumption in the reception process of the packet 10 does not increase (FIGS. 5 and 6).

Additionally, in the wired communication network 20 that makes a TCP/IP communication, if a packet loss is determined to be caused by the retransmission delay of the packet 10 in the wireless communication system 90 connected to the wired communication network 20, the packet loss is determined to be caused by congestion in the wireless communication system 90, and a control operation for strictly restricting the inflow amount of data from the wireless communication system 90 into the wired communication network 20 is performed. Therefore, the throughput of the wireless communication system 90 via the wired communication network 20 is degraded.

In contrast, in this preferred embodiment, the forcible retransmission packet 10R is forcibly retransmitted within T (<RTT) subsequently to the packet 10. Therefore, the probability that a packet loss is determined to occur is reduced in the wired communication network 20, and the throughput of the wireless communication system 90 via the wired communication network 20 is not degraded.

Second Preferred Embodiment

Figure 13:
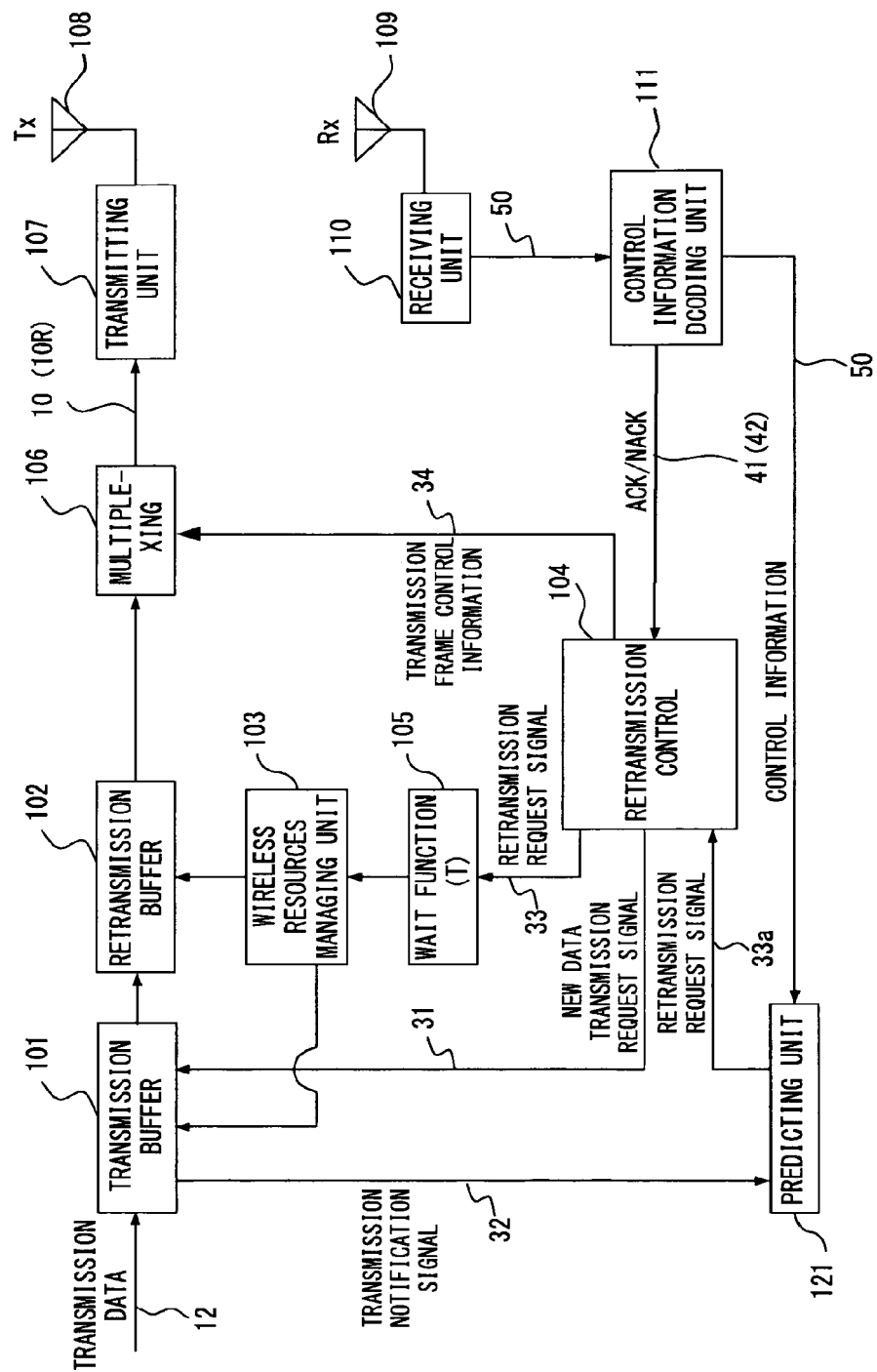
FIG. 13 is a block diagram showing one example of a configuration of a transmitting apparatus that carries out an information communication method according to another preferred embodiment of the present invention.

FIG. 13 is a block diagram showing one example of a configuration of a transmitting apparatus according to a second preferred embodiment of the present invention. This embodiment is different from the above described first preferred embodiment in a point that a predicting unit 121 is added to the transmitting apparatus 100. The configuration of the receiving apparatus 200 is the same as that of the first preferred embodiment.

Namely, in the second preferred embodiment, the transmission notification signal 32 from the transmission buffer 101 is input to the predicting unit 121, which then inputs a retransmission request signal 33a to the retransmission controlling unit 104.

Also the control information 50 is input from the control signal decoding unit 111 to the predicting unit 121. This control information 50 includes various items of information that are transmitted from the receiving apparatus 200 and indicate a communication state. The predicting unit 121 predicts whether or not to forcibly retransmit the forcible retransmission packet 10R based on the control information 50, and controls the retransmission controlling unit 104 with the retransmission request signal 33a.

In the transmitting apparatus 100, the transmission notification signal 32 is transmitted to the predicting unit 121 the same time the packet 10 including the transmission data 12 is transmitted. The predicting unit 121 predicts the possibility that the packet 10 is requested to be retransmitted based on the control information 50 input from the control signal decoding unit 111. If the possibility is high, the retransmission request signal 33a is transmitted to the retransmission controlling unit 104. Thereafter, the retransmission request signal is transmitted to the retransmission buffer 102 via the wait functioning unit 105, and the wireless resources managing unit 103, and the forcible retransmission is made in a similar manner as in the first preferred embodiment.

Figure 14:
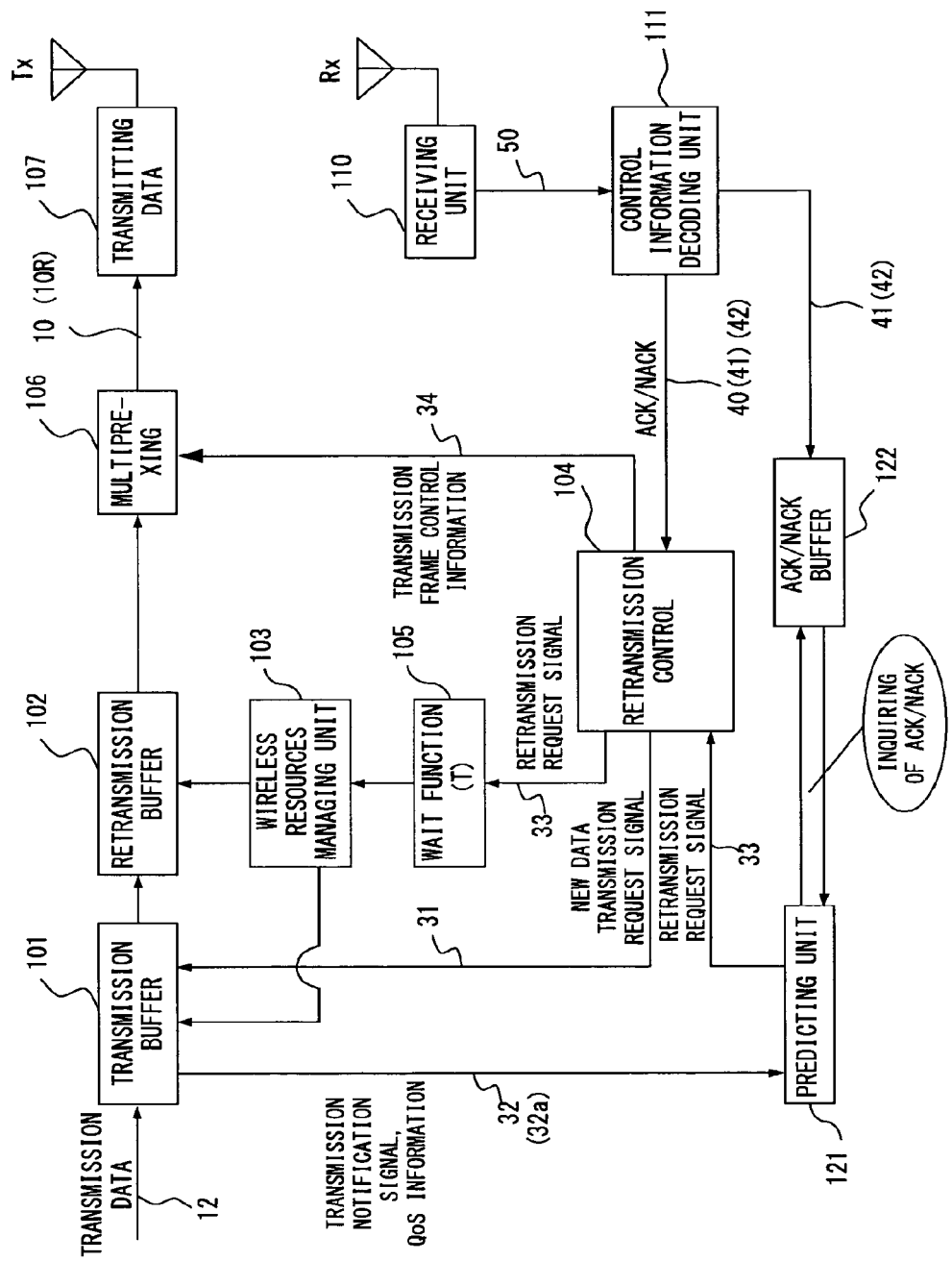
FIG. 14 is a block diagram showing a modification example of the transmitting apparatus exemplified in FIG. 13.

FIG. 14 is a block diagram showing a modification example of the above described configuration of FIG. 13. In the configuration of FIG. 14, the possibility of retransmission is predicted based on the occurrence frequencies of retransmissions of past packets.

Namely, an ACK/NACK buffer 122 is provided between the predicting unit 121 and the control signal decoding unit 111. In the ACK/NACK buffer 122, each of the frequencies of the ACK signal 41 and the NACK signal 42, which are decoded by the control signal decoding unit 111, is stored.

Figure 15:
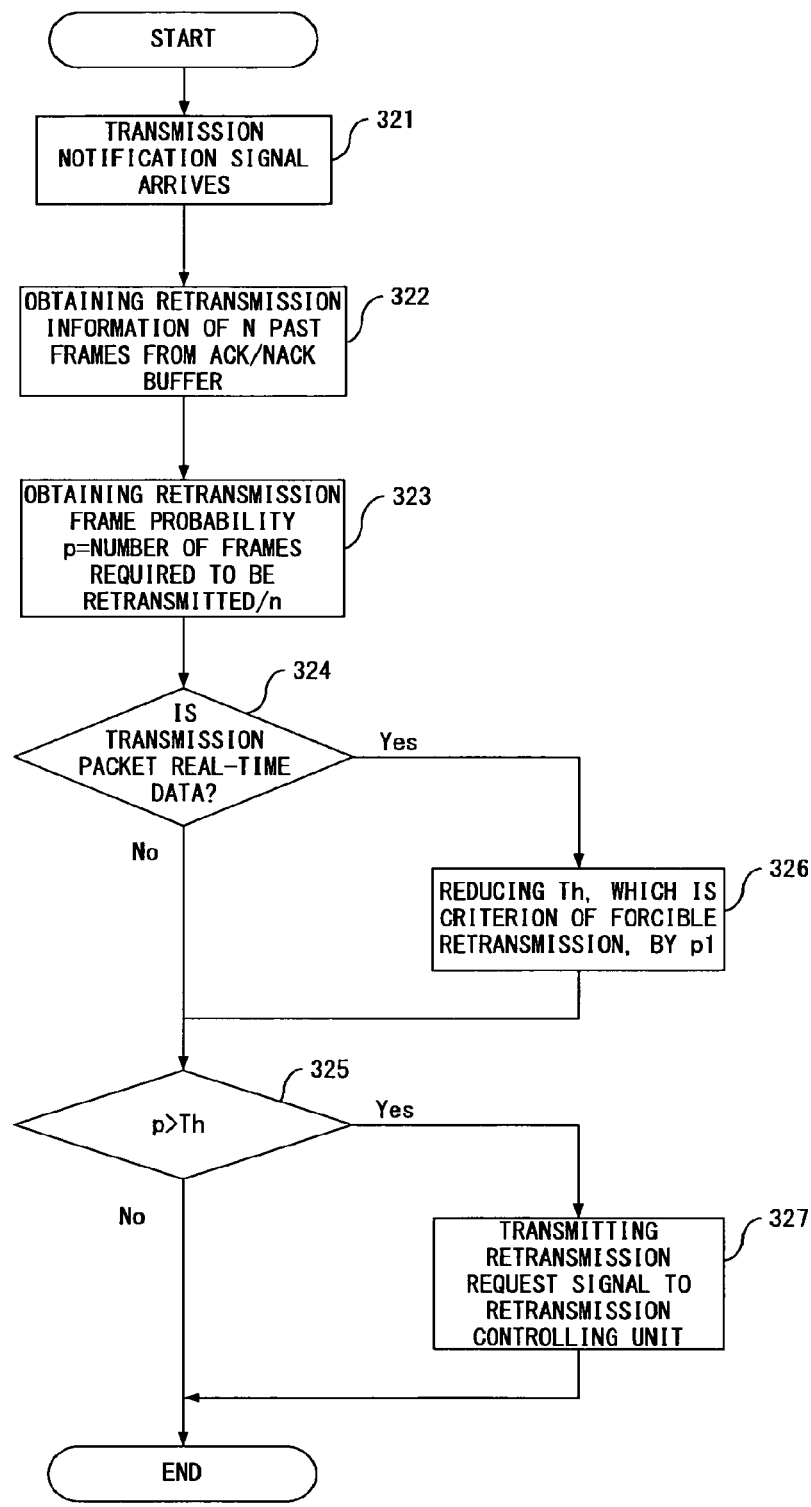
FIG. 15 is a flowchart showing the action of a modification example of the transmitting apparatus exemplified in FIG. 14.

The predicting unit 121 obtains past retransmission occurrence frequency information by referencing the ACK/NACK buffer 122, and transmits the retransmission request signal 33a to the retransmission controlling unit 104 if the occurrence frequency of retransmission is high. Additionally, QoS information 32a of the transmission data 12 is conveyed to the predicting unit 121 along with the transmission notification signal 32, whereby the possibility of retransmission can be increased by reducing a threshold value Th (threshold), which is a determination criterion of the possibility of retransmission, if immediacy is required. A state of the process executed by the predicting unit 121 at this time is represented as a flowchart shown in FIG. 15.

Namely, the predicting unit 121 reads the retransmission occurrence frequency information about n past packets 10 (frames) from the ACK/NACK buffer 122 (step 322) upon receipt of the transmission notification signal 32 from the transmission buffer 101 (step 321), and calculates a retransmission occurrence probability p=the number of frames required to be retransmitted (the number of NACK signals 42)/n (step 323).

Thereafter, whether or not the packet (transmission data 12) is real-time data is determined based on the QoS information 32a transmitted along with the transmission notification signal 32 (step 324). If the packet is real-time data, the threshold value Th, which is the determination criterion of the execution of the forcible retransmission, is reduced by p1 (step 326).

Then, whether or not p is larger than Th is determined (step 325). If p is larger than Th, the retransmission request signal 33a is transmitted to the retransmission controlling unit 104, so that the forcible retransmission is made (step 327).

Note that information about the degree of urgency of the transmission data 12 may be read from the QoS information 32a immediately after the above described step 321, the process may be immediately branched to step 327 to execute the forcible retransmission process by skipping the processes of steps 322 to 325 if the degree of urgency is high.

Figure 16:
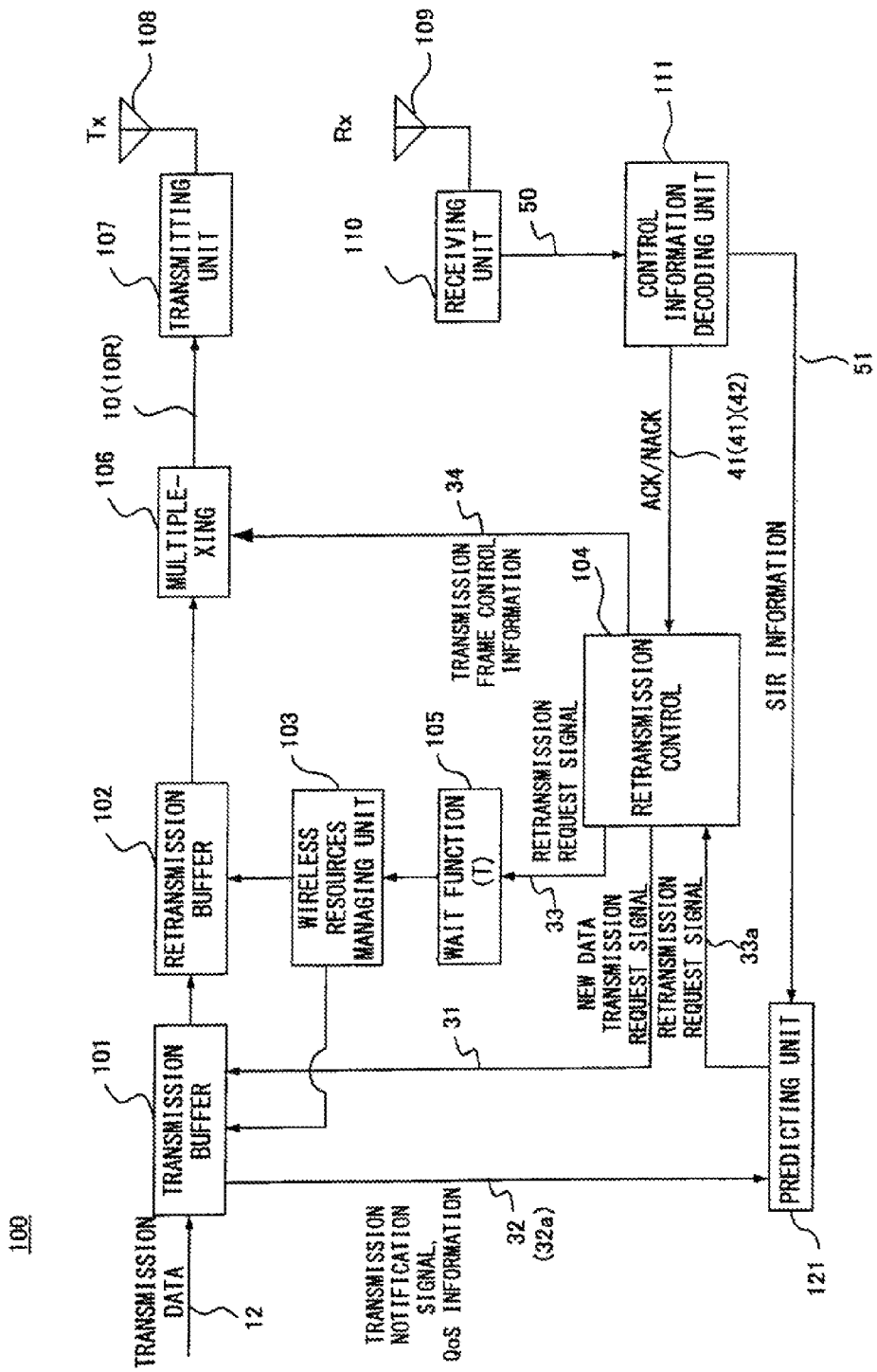
FIG. 16 is a block diagram showing a configuration of another modification example of the transmitting apparatus according to another preferred embodiment of the present invention.

FIG. 16 is a block diagram showing a configuration of another modification example of the transmitting apparatus 100 according to the second preferred embodiment. In this case, the predicting unit 121 predicts the possibility of retransmission based on the SIR information 51 transmitted from the control signal decoding unit 111. This SIR information 51 arrives with the control information 50 along with the ACK signal 41 or the NACK signal 42 from the side of the receiving apparatus 200.

Also in the configuration of FIG. 16, the probability of retransmission can be varied according to the QoS information 32a of the transmission data 12. A state of the process executed by the predicting unit 121 at this time is represented as a flowchart shown in FIG. 17.

Namely, upon receipt of the transmission notification signal 32 from the transmission buffer 101 (step 331), the predicting unit 121 obtains the value (SIR) of the SIR information 51 from the control signal decoding unit 111 (step 332).

Thereafter, whether or not the packet (transmission data 12) is real-time data is determined based on the QoS information 32a transmitted along with the transmission notification signal 32 (step 333). If the packet is determined to be real-time data, the threshold value Th, which is the determination criterion of the execution of the forcible retransmission, is increased by s1 (step 335).

Then, whether or not SIR is smaller than Th is determined (step 334). If SIR is determined to be smaller than Th, the retransmission request signal 33a is transmitted to the retransmission controlling unit 104, so that the forcible retransmission is made (step 336).

Note that information about the degree of urgency of the transmission data 12 may be read from the QoS information 32a immediately after the above described step 331, the process may be immediately branched to step 336 to execute the forcible retransmission process by skipping the processes of steps 332 to 334 if the degree of urgency is high.

As described above, in the second preferred embodiment, whether or not to make the forcible retransmission is determined based on the SIR information 51 included in the control information 50 returned from the side of the receiving apparatus 200. Therefore, if SIR is large and the state of a wireless line is favorable, a useless forcible retransmission can be prevented, transmission power can be reduced, and a forcible retransmission suitable for the real-time property of the transmission data 12 can be made.

Third Preferred Embodiment

Figure 18:
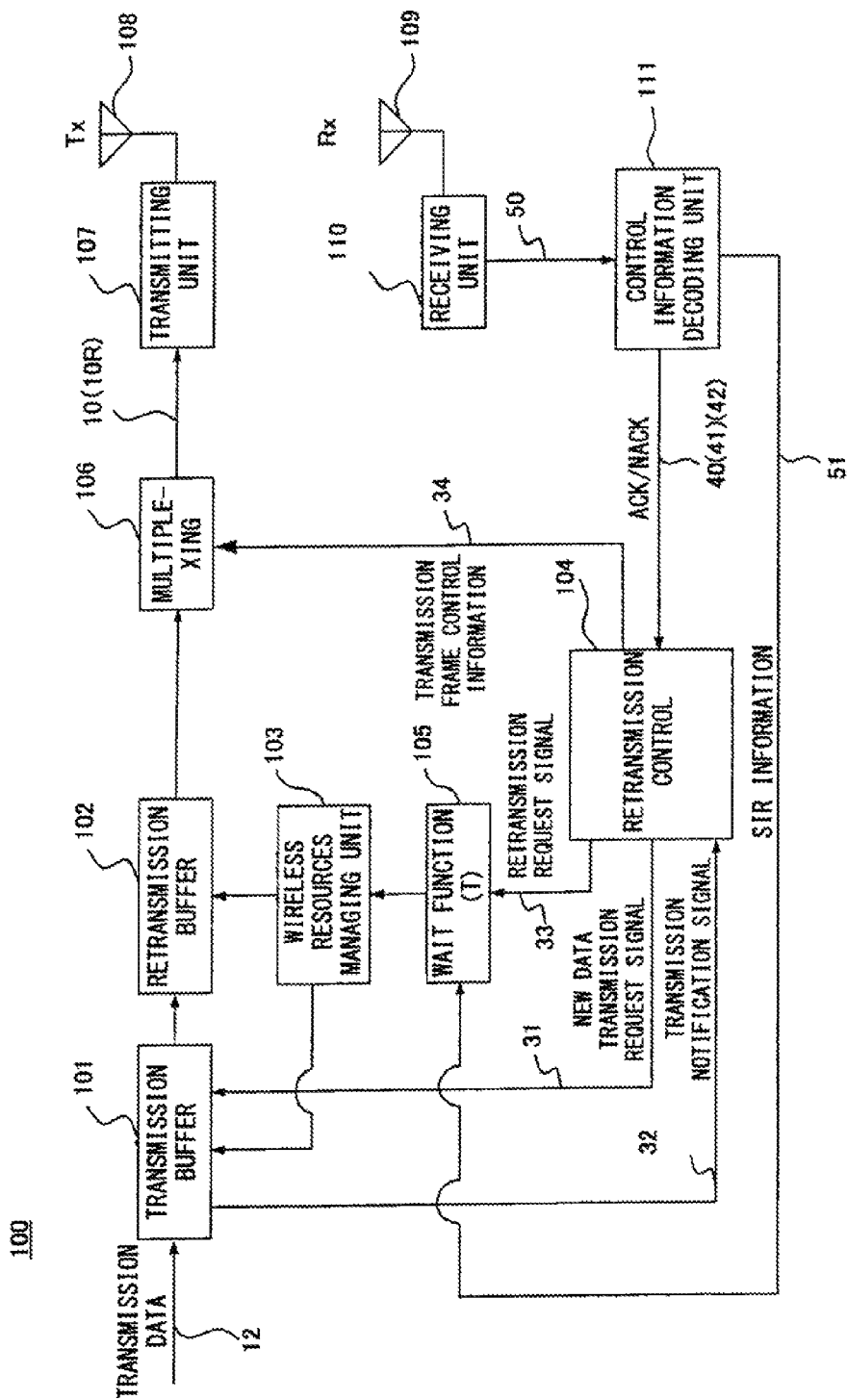
FIG. 18 is a block diagram showing an example of a configuration of a transmitting apparatus according to a further preferred embodiment of the present invention.

FIG. 18 is a block diagram showing an example of a configuration of a transmitting apparatus according to the third preferred embodiment of the present invention. A major difference from the first preferred embodiment is the process of the wait functioning unit 105. The configuration of the receiving apparatus 200 is the same as that of the first preferred embodiment.

In this preferred embodiment, the SIR information 51 is input from the control signal decoding unit 111 to the wait functioning unit 105. The time interval T until a forcible retransmission is varied according to the SIR of past packets in the wait functioning unit 105.

Figure 19:
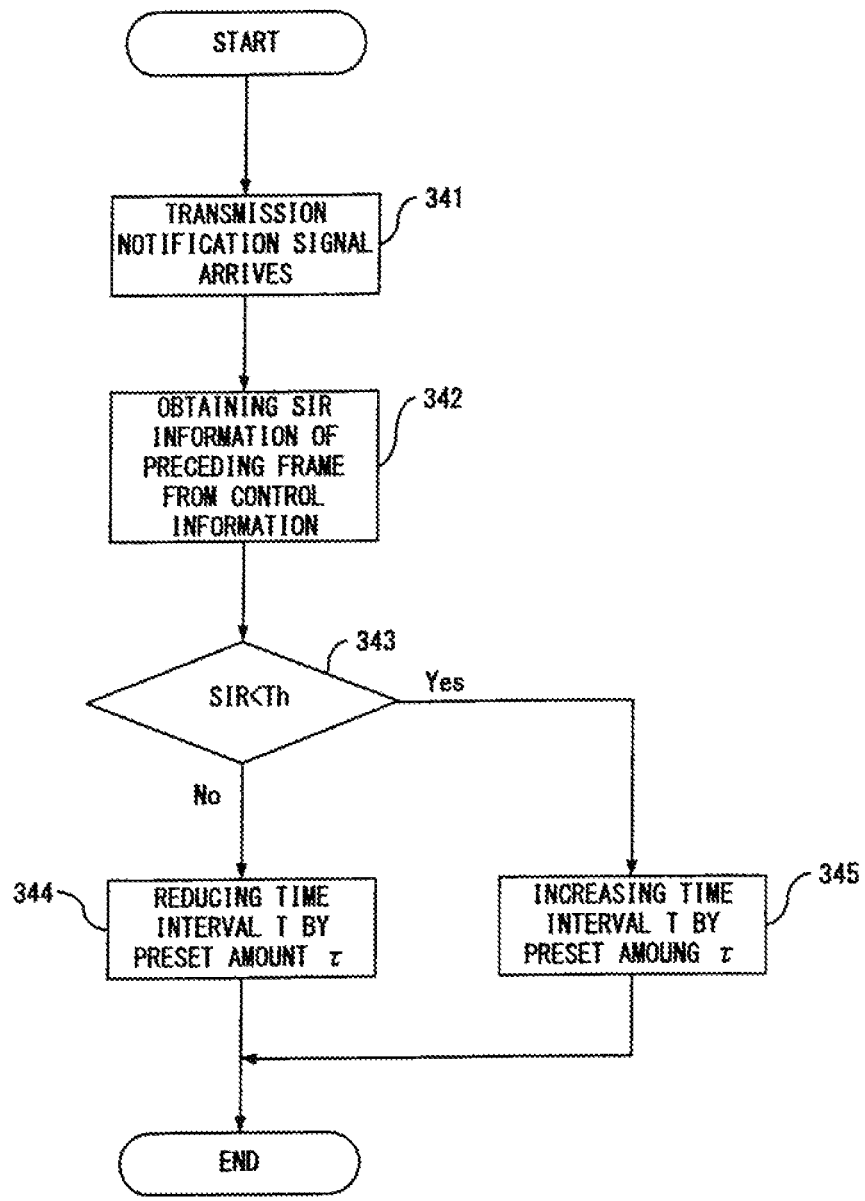
FIG. 19 is a flowchart showing the action of a modification example of the transmitting apparatus exemplified in FIG. 18.

The wait functioning unit 105 adjusts the time interval T until the forcible retransmission based on the SIR information 51 transmitted from the control signal decoding unit 111. Namely, attempts are made to further reduce a retransmission delay by shortening T if SIR is large and the state of a propagation path is favorable. Inversely, if SIR is small and the state of the propagation path is unfavorable, attempts are made to use a diversity effect by lengthening T. A state of the process executed by the wait functioning unit 105 is represented as a flowchart shown in FIG. 19. Provided here is an example in which the state of the propagation path is determined by evaluating the largeness/smallness of SIR with the threshold value Th (threshold).

Namely, when the transmission notification signal 32 is input from the transmission buffer 101 to the retransmission controlling unit 104, the retransmission controlling unit 104 inputs the retransmission request signal 33 to the wait functioning unit 105 (step 341).

At this time, the wait functioning unit 105 obtains the SIR information 51, on which the immediately preceding state of the propagation path is reflected, from the control signal decoding unit 111 (step 342).

Then, whether or not SIR is smaller than Th is determined (step 343). If SIR is determined to be smaller than Th, the time interval T is increased by a preset amount τ, and the forcible transmission is made (step 345). Or, if SIR is determined not to be smaller than Th, the time interval T is reduced by the preset amount τ, and the forcible retransmission is made (step 344).

The time interval T until the forcible retransmission is varied according to the SIR information 51 as described above, whereby the forcible retransmission packet 10R can be forcibly retransmitted at timing optimum for the state of the propagation path, which is indicated by the SIR information 51.

FIG. 20 is a block diagram showing a configuration of a modification example of the transmitting apparatus 100 according to the third preferred embodiment. In this case, the ACK/NACK buffer 122 is provided between the wait functioning unit 105 and the control information decoding unit 111. Each of the frequencies of the ACK signal 41 and the NACK signal 42, which are decoded by the control signal decoding unit 111, is stored in the ACK/NACK buffer 122.

The wait functioning unit 105 obtains from the ACK/NACK buffer 122 information about the occurrence frequencies of past NACK signals 42, namely, information about the occurrence frequency of retransmission. If the occurrence frequency of past retransmission is low, attempts are made to further reduce a retransmission delay by shortening the time interval T until the forcible retransmission. Inversely, if the occurrence frequency of retransmission is high, attempts are made to use a diversity effect by lengthening the time interval T. Its state is represented as a flowchart shown in FIG. 21. Provided here is an example in which the occurrence frequency of retransmission is determined by using the threshold value Th.

Namely, when the transmission notification signal 32 is input from the transmission buffer 101 to the retransmission controlling unit 104, the retransmission controlling unit 109 inputs the retransmission request signal 33 to the wait functioning unit 105 (step 351).

At this time, the wait functioning unit 105 obtains the retransmission information of n past packets (frames) from the ACK/NACK buffer 122, and calculates the retransmission occurrence probability p=the number of frames required to be retransmitted (the number of NACK signals 42)/n (step 353).

Then, whether or not p is larger than Th is determined (step 354). If p is determined to be larger than Th, the forcible retransmission is made by increasing the time interval T by the preset amount τ (step 356). If p is determined not to be larger than Th, the forcible retransmission is made by reducing the time interval T by the preset amount τ (step 355).

The time interval T until the forcible retransmission is varied according to the occurrence frequency of retransmission as described above, whereby the forcible retransmission packet 10R can be forcibly retransmitted at timing optimum for the state of the propagation path, which is indicated by the occurrence frequency of retransmission.

Figure 22:
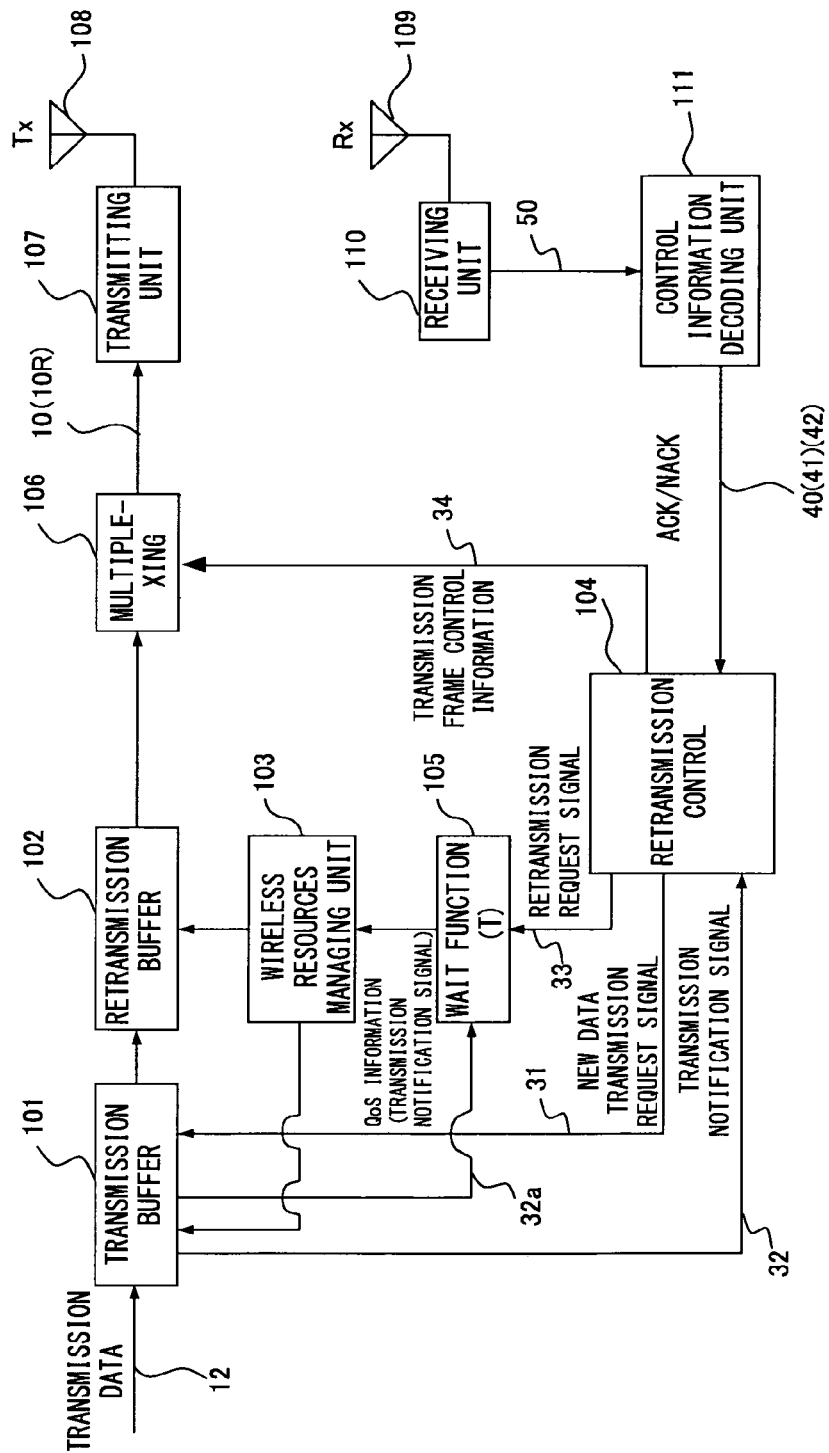
FIG. 22 is a block diagram showing another modification example of the transmitting apparatus according to the further preferred embodiment of the present invention.

FIG. 22 is a block diagram showing another modification example of the transmitting apparatus 100 according to the third preferred embodiment. In this case, the QoS information 32a about the transmission data 12 is input from the retransmission buffer 102 to the wait functioning unit 105.

The wait functioning unit 105 obtains the QoS information 32a of the transmission data 12 when the forcible retransmission packet 10R is forcibly retransmitted. If the transmission data 12 requires immediacy, attempts are made to further reduce a retransmission delay by shortening the time interval T until the forcible retransmission. Its state is represented as a flowchart shown in FIG. 23. Provided here is an example in which whether or not the transmission data 12 is real-time data is determined based on the QoS information 32a.

Namely, when the transmission notification signal 32 is input from the transmission buffer 101 to the retransmission controlling unit 104, the retransmission controlling unit 104 inputs the retransmission request signal 33 to the wait functioning unit 105 (step 361).

At this time, the wait functioning unit 105 determines whether or not the transmission data 12 within the transmission buffer 101 is real-time data based on the QoS information 32a input from the transmission buffer 101 (step 362). If the transmission data 12 is determined to be real-time data, the forcible retransmission is made by shortening the time interval T by the preset amount τ (step 364). If the transmission data is determined not to be real-time data, the forcible retransmission is made by lengthening the time interval T by the preset amount τ (step 363).

The time interval T until the forcible retransmission is variably controlled based on QoS such as the real-time property, etc., which is required by the transmission data 12, as described above, whereby a retransmission control optimum for the QoS can be realized.

The following effects are expected according to the above described preferred embodiments.

(1) The forcible retransmission packet 10R is forcibly retransmitted without waiting for RTT after the packet 10 is transmitted in the transmitting apparatus 100. Accordingly, the number of retransmissions quickly increases, and the possibility that the transmission is successfully made increases in combination with the synthesis gain (the synthesis of signal levels of the packet including an error, and the forcible retransmission packet 10R). As a result, a retransmission delay can be reduced. Especially, this is effective in a system for which a maximum retransmission delay time or the maximum number of retransmissions is predetermined.

(2) Whether or not to forcible retransmit the forcible retransmission packet 10R is determined by predicting the possibility of retransmission after the packet 10 is transmitted. This reduces a useless retransmission, leading to reductions in transmission power.

(3) The threshold value Th, which is the criterion for making a forcible retransmission, can be varied according to the immediacy of the packet 10. Therefore, a processing delay at the time of retransmission can be reduced by forcibly retransmitting a packet of real-time data, etc. with high priority.

(4) Transmission power is somewhat wasted when a retransmission is made without making a prediction. However, a forcible retransmission is forcibly made by a plural number of times without making a prediction, whereby a retransmission delay can be improved.

(5) The time interval T until the forcible retransmission of the forcible retransmission packet 10R after the transmission of the packet 10 is varied according to the state of a propagation path, the occurrence frequency of retransmission, etc., whereby a time diversity effect and reductions in a processing delay can be achieved.

According to the embodiment of the present invention, a retransmission delay time in the retransmission control of communication data can be shortened.

Additionally, a wireless communication using the retransmission control of communication data can be realized without degrading a communication rate in a communication network where degradation in the communication rate, which is caused by a transmission delay, is relatively large.

Note that the present invention is not limited to the configurations exemplified in the above described preferred embodiments, and various modifications can be made within a scope that does not depart from the gist of the present invention as a matter of course.

For example, embodiments of the present invention are not limited to wireless communications, but widely applicable to retransmission techniques such as ARQ, HARQ, etc. in general wired communications.

What is claimed is:

1. A wireless communication system comprising:
   a transmitting apparatus; and
   a receiving apparatus, wherein
   the transmitting apparatus transmits first data to the receiving apparatus,
   the transmitting apparatus performs transmission of second data, data part of which is same as that of the first data, without waiting for a first feedback signal from any receiving apparatus regarding the first data,
   the transmitting apparatus does not perform retransmission of the first data when the transmitting apparatus receives the first feedback signal regarding the first data and waits for a second feedback signal regarding the second data, and
   the receiving apparatus transmits the second feedback signal regarding the second data to the transmitting apparatus.

2. The wireless communication system according to claim 1, wherein
   the transmitting apparatus performs transmission of the second data without waiting for a negative acknowledgement (NACK) signal regarding the first data, and waits for an acknowledgement (ACK) signal or a NACK signal regarding the second data, and
   the receiving apparatus transmits the ACK signal or the NACK signal regarding the second data to the transmitting apparatus.

3. The wireless communication system according to claim 1, wherein the transmitting apparatus performs retransmission of the first data according to reception of the second feedback signal regarding the second data.

4. A retransmission method for use in a wireless communication system in which retransmission is performed between a transmitting apparatus and a receiving apparatus, the retransmission method comprising:
   transmitting first data from the transmitting apparatus to the receiving apparatus;
   performing, by the transmitting apparatus, transmission of second data, the data part of which is same as that of the first data, without waiting for a first feedback signal from any receiving apparatus regarding the first data, and waiting for a second feedback signal regarding the second data; and
   transmitting the second feedback signal regarding the second data to the transmitting apparatus,
   wherein the transmitting apparatus does not perform retransmission of the first data when the transmitting apparatus receives the first feedback signal regarding the first data.

5. The retransmission method according to claim 4, wherein
   the transmitting apparatus performs transmission of the second data without waiting for a negative acknowledgement (NACK) signal regarding the first data, and wait for an acknowledgement (ACK) signal or the NACK signal regarding the second data, and
   the receiving apparatus transmits the ACK signal or a NACK signal regarding the second data to the transmitting apparatus.

6. The retransmission method according to claim 4, further comprising performing, by the transmitting apparatus, retransmission of the first data according to reception of the second feedback signal regarding the second data.

7. A wireless communication system comprising:
a transmitting apparatus; and
a receiving apparatus, wherein
the transmitting apparatus transmits first data to the receiving apparatus,
the transmitting apparatus performs transmission of second data, data part of which is same as that of the first data, without waiting for a first feedback signal from any receiving apparatus regarding the first data,
the transmitting apparatus does not perform retransmission of the first data when the transmitting apparatus receives a first feedback signal regarding the first data and waits for a second feedback signal regarding the second data, and
the receiving apparatus transmits the second feedback signal regarding the second data to the transmitting apparatus.

8. The wireless communication system according to claim 7, wherein
the transmitting apparatus performs transmission of the second data, and waits for an acknowledgement (ACK) signal or a negative acknowledgement (NACK) signal regarding the second data, and
the receiving apparatus transmits the ACK signal or the NACK signal regarding the second data to the transmitting apparatus.

9. The wireless communication system according to claim 7, wherein the transmitting apparatus performs retransmission of the first data according to reception of the second feedback signal regarding the second data.

10. A retransmission method for use in a wireless communication system in which retransmission is performed between a transmitting apparatus and a receiving apparatus, the retransmission method comprising:
transmitting first data from the transmitting apparatus to the receiving apparatus;
performing, by the transmitting apparatus, transmission of second data, data part of which is same as that of the first data without waiting for a first feedback signal from any receiving apparatus regarding the first data, and waiting for a second feedback signal regarding the second data; and
transmitting the second feedback signal regarding the second data to the transmitting apparatus,
wherein the transmitting apparatus does not perform retransmission of the first data when the transmitting apparatus receives a first feedback signal regarding the first data.

11. The retransmission method according to claim 10, wherein
the transmitting apparatus performs transmission of the second data, and waits for an acknowledgement (ACK) signal or a negative acknowledgement (NACK) signal regarding the second data, and
the receiving apparatus transmits the ACK signal or the NACK signal regarding the second data to the transmitting apparatus.

12. The retransmission method according to claim 10, further comprising:
performing, by the transmitting apparatus, retransmission of the first data according to reception of the second feedback signal regarding the second data.

13. A wireless communication system comprising:
a transmitting apparatus; and
a receiving apparatus, wherein
the transmitting apparatus transmits first data to the receiving apparatus,
the transmitting apparatus performs transmission of second data which is retransmission of the first data without waiting for a first feedback signal from any receiving apparatus regarding the first data, and receives only a second feedback signal transmitted regarding the second data, and
the receiving apparatus transmits the second feedback signal regarding the second data to the transmitting apparatus,
the transmitting apparatus does not perform retransmission of the first data based on a first feedback signal regarding the first data.

14. A wireless communication system in which retransmission is performed between a transmitting apparatus and a receiving apparatus, comprising:
the transmitting apparatus; and
the receiving apparatus, wherein
the transmitting apparatus includes a first transmitting unit to transmit first data to the receiving apparatus,
the transmitting apparatus includes a retransmission controlling unit to perform transmission of second data which is retransmission of the first data without receiving a first feedback signal from any receiving apparatus regarding the first data, and receive a second feedback signal regarding the second data, and
the receiving apparatus includes a second transmitting unit to transmit the second feedback signal regarding the second data to the transmitting apparatus, and
the retransmission controlling unit does not perform retransmission of the first data based on the first feedback signal regarding the first data.

* * * * *